United States Patent
Louw et al.

(10) Patent No.: US 7,225,561 B2
(45) Date of Patent: Jun. 5, 2007

(54) OXYFLUORINATION

(75) Inventors: Izak deVilliers Louw, Gauteng Province (ZA); Pieter Andries Blatt Carstens, Gauteng Province (ZA)

(73) Assignee: South African Nuclear Energy Corporation Limited (ZA)

( * ) Notice: Subject to any disclaimer, the term of this patent is extended or adjusted under 35 U.S.C. 154(b) by 0 days.

(21) Appl. No.: 10/532,461

(22) PCT Filed: Oct. 23, 2003

(86) PCT No.: PCT/IB03/04701

§ 371 (c)(1),
(2), (4) Date: Sep. 29, 2005

(87) PCT Pub. No.: WO2004/037905

PCT Pub. Date: May 6, 2004

(65) Prior Publication Data

US 2006/0118988 A1  Jun. 8, 2006

(30) Foreign Application Priority Data

Oct. 25, 2002 (ZA) ................. 2002-8671
Feb. 18, 2003 (ZA) ................. 2003-1355

(51) Int. Cl.
*F26B 7/00* (2006.01)

(52) U.S. Cl. ............. 34/310; 34/329; 34/418; 428/457; 156/60; 427/403

(58) Field of Classification Search ............. 34/305, 34/310, 329, 380, 418, 443; 428/457, 689; 156/60; 427/403
See application file for complete search history.

(56) References Cited

U.S. PATENT DOCUMENTS

| 4,800,053 | A | 1/1989 | Bauman et al. |
| 6,620,282 | B2 * | 9/2003 | Mori et al. ............... 156/272.2 |
| 6,790,526 | B2 * | 9/2004 | Vargo et al. ................ 428/343 |
| 2001/0009176 | A1 | 7/2001 | Mori et al. |

FOREIGN PATENT DOCUMENTS

| CN | 1336281 | 2/2002 |
| GB | 1488931 A | 10/1977 |
| JP | 58199132 A | 11/1983 |

OTHER PUBLICATIONS

PCT International Search Report for International Patent Application No. PCT/US2003/004701 (cited references listed above).

* cited by examiner

*Primary Examiner*—S. Gravini
(74) *Attorney, Agent, or Firm*—Howrey LLP

(57) ABSTRACT

The invention provides a process for the activation by oxyfluorination of at least part of a surface of a solid, which process includes exposing, under selected conditions of temperature and pressure and for a selected reaction time, at least part of the surface of the material of the solid to an oxfluorinating atmosphere. The oxyfluorinating atmosphere is a gas/vapor mixture which includes at least one fluorine-containing gas which reacts with the material of the exposed surface, at least one oxygen-containing gas which reacts with the material of the exposed surface, and water vapor. The gases in the oxyfluorinating atmosphere act to oxyfluorinate the exposed surface, thereby to activate it, and the water vapor acts to enhance the activation.

10 Claims, 2 Drawing Sheets

OXYFLUORINATION

Figure 1:
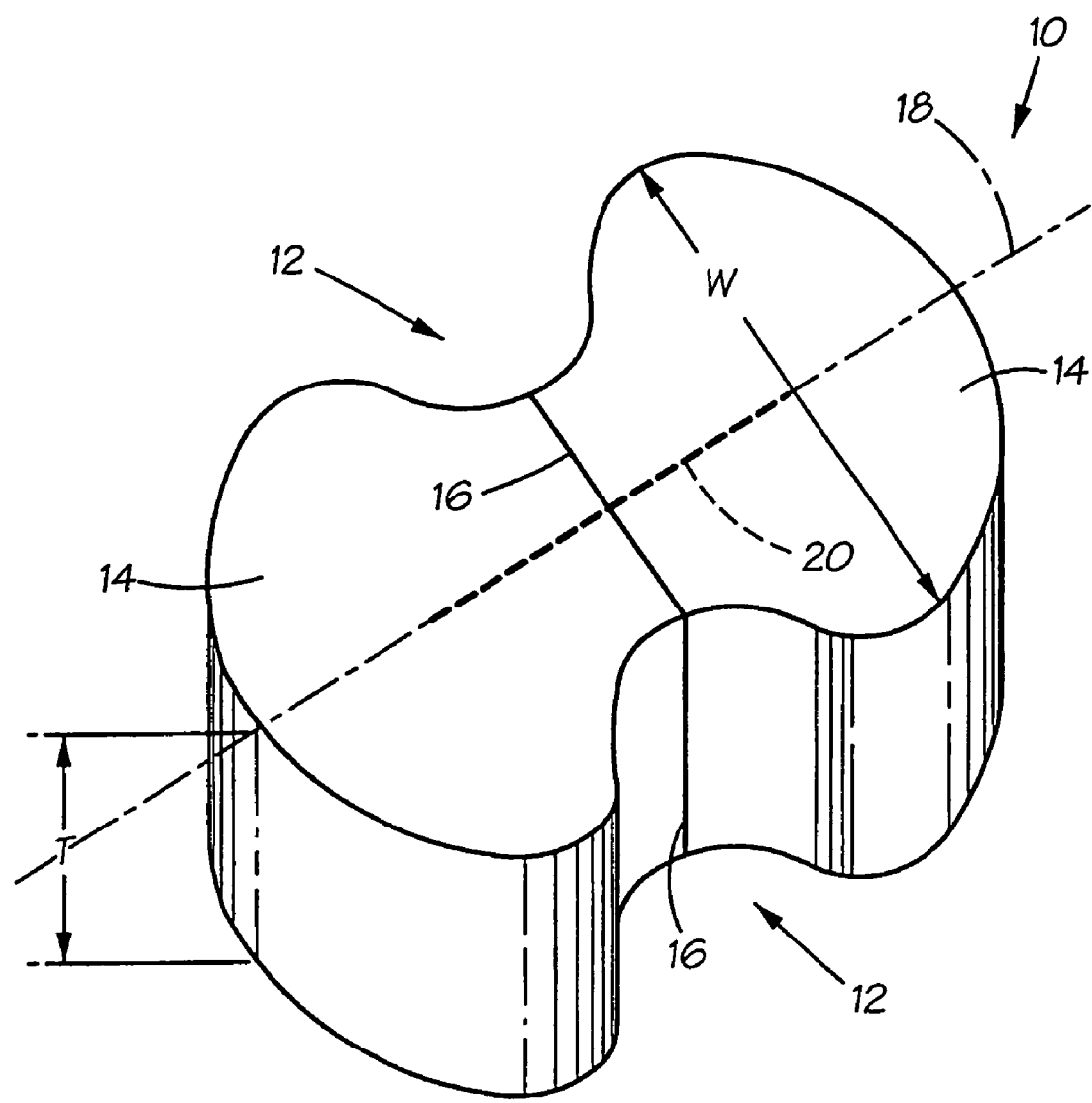

This application is a §371 U.S. national stage filing of international application PCT/IB2003/00470 1, filed 23 Oct. 2003 (published in English on 6 May 2004 as WO 2004/037905 A1) and claiming priority to ZA 2002/8671 filed 25 Oct. 2002 and ZA 2003/1355 filed 18 Feb. 2003.

THIS INVENTION relates, broadly, to oxyfluorination. More particularly the invention relates to a process for the oxyfluorination of a surface of a solid to activate it.

According to the invention, there is provided a process for the activation by oxyfluorination of at least part of a surface of a solid, which process includes exposing, under selected conditions of temperature and pressure and for a selected reaction time, at least part of the surface of the material of the solid to an oxyfluorinating atmosphere which is a gas/vapour mixture which includes at least one fluorine-containing gas which reacts with the material of the exposed surface, at least one oxygen-containing gas which reacts with the material of the exposed surface, and water vapour, said gases in the oxyfluorinating atmosphere acting to oxyfluorinate the exposed surface, thereby to activate it, and the water vapour acting to enhance the activation of the exposed surface to enhance the amenability of the exposed surface to adhesive bonding to other materials, the process including selecting the fluorine-containing gas from the group consisting of $F_2$, $XeF_2$, $ClF$, $ClF_3$, $BrF$, $BrF_3$, $BrF_5$, $IF_7$, $OF_2O_2F_2$ and mixtures of any two or more thereof.

By fluorine-containing gas is meant that each molecule of the gas contains at least one fine atom, and the term oxygen-containing gas has a corresponding meaning.

In particular, the enhancement of the activation of the exposed surface may act to enhance the amenability of the exposed surface to adhesive bonding to other materials. Such other materials include inks or pigments printed thereon, coating materials deposited thereon by metallization such as vapour phase metallization, and in particular glues and adhesives, ceramics and paints. Such other materials also include matrix materials such as concretes or other set cementitious materials or the like, reinforced by the solid having the activated surface in the reinforcement of such matrix materials by oxyfluorinated reinforcing materials, for example in the production of composite products.

Thus, for applications involving the formation of an adhesive bond between two components, by bringing the components into contact with each other with one of the components being in a flowable or mouldable state and with the other of the components being in solid form and having a surface at least partly activated by oxyfluorination, and causing or allowing the flowable or mouldable component to set or cure in contact with the solid component, thereby to bond adhesively to the solid component to form an adhesive bond therebetween, the process of the present invention acts to provide the solid component with a surface whose enhanced activation in turn enhances adhesion of the set or cured component to the solid component, the surface activation of the solid component being effected prior to bringing the components into contact with each other.

The process may include selecting the solid material which is subjected to activation by oxyfluorination from the group consisting of polymeric materials having constituents which are confined to carbon and hydrogen, elastomeric materials having constituents which are confined to carbon and hydrogen, polymeric materials having constituents which are not confined to carbon and hydrogen and which include, in addition to carbon and hydrogen, other atomic species as constituents, elastomeric materials having constituents which are not confined to carbon and hydrogen and which include, in addition to carbon and hydrogen, other atomic species as constituents, carbon, glasses, metals, metalloids, wood, leather, cotton, wool, ceramics, asbestos and blends and mixtures thereof. It is expected that the enhanced bonding of the present invention will have substantial utility in the coating of polymeric and elastomeric substrates, particularly those which are refractory or resistant to coating. When the process is used to produce activated polymeric or elastomeric products which are intended for coating, the process may include selecting the solid material which is subjected to activation by oxyfluorination from the group of materials consisting of polymeric materials, elastomeric materials and mixtures of any two or more thereof. The process may include selecting the solid material which is subjected to activation by oxyfluorination from the group of such materials having constituents which are confined to carbon and hydrogen, such as hydrocarbon polymers, or instead, the process may include selecting the solid material which is subjected to activation by oxyfluorination from the group of such materials having constituents which are not confined to carbon and hydrogen and which include, in addition to carbon and hydrogen, other atomic species as constituents. Such polymeric materials and mixtures or blends thereof all comprise hydrogen atoms which can be replaced by fluorine atoms. Such polymers can be used for the mass production of motor-vehicle parts, such as bumpers or buffers, in which case it can be important and desirable to be able to coat them with durable paint coatings, which adhere strongly thereto. Similar considerations can nevertheless also apply to coating solid materials which are not of polymeric materials, but which have surfaces which can be activated by the activating atmosphere to receive coatings, with desirable adhesion thereto.

It is further expected that the products of the process of the present invention will have substantial utility in the production of composite materials, structures and/or artifacts wherein a matrix such as a cementitious matrix is strengthened or reinforced by reinforcing material. In these cases the component in the flowable mouldable state is typically a cementitious slurry which is caused or allowed to set and/or cure in contact with the solid component which acts as a reinforcing component, to form a set cementitious matrix which adhesively adheres by means of a cementitious bond to the reinforcing component so that the matrix is strengthened and reinforced thereby. Such cementitious matrices have, typically, a relatively low tensile strength and/or a relatively low fracture toughness, whereas the reinforcing materials typically have a relatively high tensile strength and/or fracture toughness. The reinforcing material will thus be solid at ambient temperatures and may comprise particles such as granules, or, in particular, fibres, and may be in the form of a polymeric material, a metal, carbon or a glass which is activated by the oxyfluorination.

As indicated above, examples of polymeric materials contemplated for activation by oxyfluorination by the process of the present invention include polymers which are polyhydrocarbons such as polypropylene, polyethylene, polystyrene, polypentene, polybutadiene, or the like, consisting only of carbon and hydrogen, and mixtures or blends of two or more such polymers, which may be selected from hydrocarbon homopolymers and copolymers such as block copolymers, random- or statistical copolymers and graft copolymers, and from higher polymers such as terpolymers, containing only carbon and hydrogen. Instead, the polymeric materials selected for activation by oxyfluorination may comprise polymers of olefins which do not only contain carbon and hydrogen. Furthermore, depending on their end use, said hydrocarbon polymers may be blended or mixed with application-specific additives which do not contain only carbon and hydrogen, and/or the hydrocarbon polymers may be blended or mixed with polymers of olefins which do not contain only carbon and hydrogen, but which contain other constituents, each of such polymer groups again optionally being homopolymers or copolymers such as block copolymers, random- or statistical copolymers, graft copolymers, or higher polymers such as terpolymers, for example polyamides (nylons), aramids (kevlars) or acrylonitrite butadiene styrenes (ABS polymers), one or more of which olefins is a polymer having a constituent other than carbon or hydrogen, provided that the polymer containing the application-specific additive or having a constituent other than carbon or hydrogen comprises hydrogen atoms which are replaceable by fluorine atoms, before activation thereof in accordance with the process of the present invention. Blends which are activated by oxyfluorination may be formed by physically blending their constituents or by polymerizing their constituents together in a reactor. Whatever the nature of the polymer, it should, however, contain hydrogen surface atoms which are replaceable by fluorine atoms and preferably also by oxygen atoms during oxyfluorination of its surface.

When the enhanced bonding of the products of the process of the present invention is utilized for the strengthening and reinforcement of a cementitious matrix, the reinforcing component material is conveniently a polypropylene or a polyethylene, such as an ultra-high mass polyethylene (UHMPE), or a higher polymer such as a nylon, a kevlar or an ABS polymer, or indeed a material other than a polymer, but which has surfaces which can be activated by the activating atmosphere of the present process, examples being carbon and steels such as mild steel, galvanized steel and stainless steel. When the enhanced bonding of the products of the process of the present invention is utilized for the coating of solid components in the form of polymers, the polymer is conveniently an olefinic polymer such as a polypropylene homopolymer, a high-density polyethylene (HDPE) or a reactor-grade thermoplastic olefin (RTPO).

The process may include selecting the solid material which is subjected to activation by oxyfluorination from the group of materials consisting of carbon, glasses, metals, metalloids and mixtures of any two or more thereof. In particular, the process may include selecting carbon as the solid material which is subjected to activation by oxyfluorination.

Instead, the process may include selecting the solid material which is subjected to activation by oxyfluorination from metals and metalloids which are members of the group consisting of mild steel, low carbon steel, stainless steel, and mixtures or alloys of any two or more thereof. In particular, the process may thus include selecting mild steel or low carbon steel as the solid material which is subjected to activation by oxyfluorination.

As will be appreciated and as indicated above, exposing the surface of the solid material to the oxyfluorinating atmosphere comprising the gas/vapour mixture of the present invention will be under conditions of temperature and pressure, and for a reaction time, selected to provide the exposed surface with desired properties such as, in particular, an enhanced amenability to adhesive bonding to other materials. In particular, the process may include selecting the fluorine-containing gas which reacts with the exposed surface from the group consisting of molecular fluorine ($F_2$), fluorinated noble gases, fluorohalogens, oxides of fluorine, and mixtures of any two or more thereof. As indicated above, the fluorine-containing gas may be molecular fluorine ($F_2$) itself, or it may be made up of one or molecular suitable fluorine-containing gaseous compounds, examples of which are fluorinated noble gases such as $XeF_2$, or fluorohalogens such as $ClF$, $ClF_3$, $BrF$, $BrF_3$, $BrF_5$, and $IF_7$, or oxides of fluorine such as $OF_2$ or $O_2F_2$ so that, in other words, the oxyfluorinating atmosphere may include a fluorine-containing gaseous compound selected from the group consisting of $F_2$, $XeF_2$, $ClF$, $ClF_3$, $BrF$, $BrF_3$, $BrF_5$, $IF_7$, $OF_2$ or $O_2F_2$ and mixtures of at least two such gases.

Furthermore, the process may include selecting the oxygen-containing gas which reacts with the exposed surface from molecular oxygen ($O_2$) (such as the oxygen present in ambient air), ozone ($O_3$) and mixtures thereof. In other words, the oxygen-containing gas may be selected from the group of oxygen-containing gaseous compounds consisting of $O_2$, $O_3$ and mixtures thereof.

Optionally, the oxyfluorinating atmosphere may include, in addition to any fluorine-containing gaseous compound, any oxygen-containing gaseous compound and any further reactive gas, also at least one inert- or diluent gas which is inert to, and does not react with, the exposed solid material surface, such gas being, for example, helium, argon, carbon dioxide, or, in particular, molecular nitrogen ($N_2$). Thus, broadly, the process may include diluting the oxyfluorinating atmosphere with a diluent gas which is inert to the exposed surface and inert to the other constituents of the oxyfluorinating atmosphere, and does not react therewith. For example, the oxyfluorinating atmosphere may be a mixture of fluorine gas and wet or moist air containing water vapour, which can more correctly be regarded as humid air, the atmosphere having, as constituents, $F_2$, $O_2$, $N_2$, and water vapour. Thus, the process may include selecting the inert gas from the group consisting of nitrogen, the noble gases and mixtures of any two or more thereof. More particularly, the process may gases and mixtures of any two or more thereof. More particularly, the process may include selecting the inert gas from the group consisting of helium, argon, carbon dioxide, molecular nitrogen ($N_2$) and mixtures of any two or more thereof.

In particular, the process may include using, as the oxyfluorinating atmosphere, a gas/vapour mixture of molecular fluorine ($F_2$) molecular oxygen ($O_2$) and water vapour. In this case, the process may include diluting the oxyfluorinating atmosphere, using molecular nitrogen ($N_2$) as a diluent.

If desired, the gas/vapour mixture may have its activity enhanced by subjecting it to ultra-violet (UV) radiation. Thus, optionally, the process may include subjecting the oxyfluorinating atmosphere to ultra-violet radiation before the exposing of the solid material to the oxyfluorinating atmosphere is ended. The subjecting of the oxyfluorinating atmosphere to ultra-violet radiation may be prior to the exposing of the solid material to the oxyfluorinating atmosphere. Instead or in addition, the subjecting of the oxyfluorinating atmosphere to ultra-violet radiation may be during the exposing of the solid material to the oxyfluorinating atmosphere.

The reaction conditions may vary between relatively broad limits. Thus the process may include exposing the solid material to a said oxyfluorinating atmosphere in which the fluorine-containing gas includes molecular fluorine ($F_2$) at a partial pressure of 0.01–200 kPa. The exposing of the solid material to the oxyfluorinating atmosphere may be for a period of 0.10 seconds–10 hours, at a total pressure of the oxyfluorinating atmosphere of 0.1–500 kPa with the surface of the solid material and the activating atmosphere at a temperature at which the solid material has a surface which is stable. By stable in this regard is meant that the surface shows no tendency to soften or melt at the temperature in question, and no tendency to char, decompose or disassociate. Preferably, the exposing of the solid material to the oxyfluorinating atmosphere is at a total pressure of 1–200 kPa, and at a said temperature which is above 0° C., for a period of 0.1 seconds–1 hour. More particularly, the exposing of the solid material to the oxyfluorinating atmosphere may be at a pressure 5–150 kPa and at a said temperature which is 20–100° C., for a period of 1 second–10 minutes. In other words, exposing the solid surface to the oxyfluorinating atmosphere may be for a period of 0.10 seconds–10 hours, e.g. 1 second–1 hour, at a total pressure of the activating atmosphere of 0.1 kPa–500 Kpa, e.g. 1 kPa–200 kPa, and at a temperature of the surface of the solid and of the oxyfluorinating atmosphere of above 0° C. at which the reinforcing component is solid, e.g. 0° C. up to the melting point of the solid, if it melts rather than charring or decomposing.

Furthermore, in the oxyfluorinating atmosphere, the fluorine-containing gas may, as indicated above, have a partial pressure from as low as 0.01 kPa up to as high as 200 kPa, when the fluorine-containing gas is $F_2$. Preferably the partial pressure, when the fluorine-containing gas is $F_2$, is 0.1–10 kPa, more preferably 1–5 kPa. Thus, the activation may be effected by exposing the solid surface to the oxyfluorinating atmosphere at a pressure of 1–200 kPa, more preferably 5–150 kPa, and at a temperature above 0° C. and below the melting or charring/decomposition temperature of the material of the solid, i.e. typically 20–100° C. Reaction times which are short have been found to be feasible, for example 0.1–60 seconds, typically 1–10 seconds or even 1–5 seconds.

In particular, the process may include exposing the solid material to a said oxyfluorinating atmosphere which, in addition to its comprising a fluorine-containing gas, an oxygen-containing gas and water vapour, includes at least one further reactive constituent selected from the group consisting of halogens, interhalogen compounds and mixture of any two or more thereof. In other words, the oxygenating atmosphere may, in addition to its comprising a fluorine-containing gas, an oxygen-containing gas, water vapour and any inert or diluent gas used, contain also at least one further reactive constituent selected from halogens other than fluorine, such as chlorine ($Cl_2$), bromine ($Br_2$) or indeed iodine ($I_2$) vapour, or selected from interhalogen compounds or mixtures thereof. The proportion of the fluorine-containing gas in the oxyfluorinating atmosphere can vary within wide limits. Thus, the fluorine-containing gas may form 0.1–99.0% by volume of said mixture, typically 1–30% by volume thereof. Particularly preferred oxyfluorinating atmospheres include those in which the fluorine-containing gas such as $F_2$ forms 5–20% by volume and oxygen ($O_2$) forms 5–95% by volume. The water vapour content of the oxyfluorinating atmosphere may be such that it has a relative humidity of 0.1–99%, preferably 30–90%, e.g. 50–80%.

Furthermore, the process may include exposing the solid material to a said oxyfluorinating atmosphere having a fluorine-containing gas content of 0.1–99% by volume. In particular, the exposing of the solid material may be to a said oxyfluorinating atmosphere having a fluorine-containing gas content of 1–30% by volume. Preferably, the process may include exposing the solid material to a said oxyfluorinating atmosphere of which the fluorine-containing gas forms 5–20% by volume and the oxygen-containing gas forms 5–95% by volume. Furthermore, the process may include exposing the solid material to an activating atmosphere which has a relative humidity of 0.1–99%, preferably 30–99%, and more preferably 50–80%.

Furthermore the process may include exposing the solid material to the oxyfluorinating atmosphere until the surface concentration of fluorine of said exposed surface has been increased by at least 0.01 $\mu gF/cm^2$. While the process may be such as to provide the exposed solid surface with a relatively low surface fluorine concentration, e.g. in the range of 0.01 $\mu gF/cm^{2-50}$ $\mu gF/cm^2$, the process may be used to provide higher surface fluorine concentrations of above 50 $\mu gF/cm^2$, which are obtainable, if desired.

In a particular embodiment, the fluorine-containing gas may be $F_2$, being present in the oxyfluorinating atmosphere at a partial pressure of 0.01 kPa–200 kPa, the exposing of the surface of the solid to the oxyfluorinating atmosphere being such as to provide the surface with a surface fluorine concentration of 0.01–50 $\mu gF/cm^2$. Thus, the process may include exposing the solid material to the oxyfluorinating atmosphere until the surface concentration of fluorine of said exposed surface has been increased by 0.01–50 $\mu gF/cm^2$.

In a particular embodiment, the process may include, prior to the exposing of the solid material to the oxyfluorinating atmosphere, degreasing the exposed surface, for example by washing the solid with water and a detergent followed by rinsing it with water and then treating it with isopropanol or another suitable organic solvent such as those used in the motor trade for dislodging grease or oil.

The process may include exposing the solid material to the oxyfluorinating atmosphere in a reaction chamber in a reaction vessel, the process including flushing the reaction chamber by means of the oxylfuorinating atmosphere prior to the exposing of the solid material to the oxyfluorinating atmosphere. The exposing of the solid surface to the activating atmosphere in the reaction chamber or the reaction vessel, which has been flushed by means of such oxyfluorinating atmosphere, may be carried out on a continuous basis or on a batchwise basis. If carried out on a continuous basis, exposing the solid surface to the atmosphere may be effected in in-line fashion by continuously transporting the solid through a reaction chamber, which may be open-ended, containing the atmosphere, which atmosphere may be replenished or continuously flushed through the reaction chamber at a suitable rate to maintain the desired concentrations of the reagent gases in the atmosphere. The oxyfluorinating or activating atmosphere may, as indicated above and if desired, be subjected to UV radiation, during the exposure of the solid thereto.

Naturally, routine experimentation will be carried out with regard to the various parameters such as oxyfluorinating or activating atmosphere compositions and pressures, reaction times, temperatures, or solid materials whose surfaces are activated, and the fluorine- and oxygen surface concentrations achieved thereon, to achieve optimum, or at least acceptable, results, bearing practical and economic considerations in mind.

The invention extends also to an oxyfluorination product whenever produced by the process of the present invention.

With regard to the coating of solid materials having surfaces activated by the process of the present invention, applying the coating to the oxyfluorinated surface may be by painting e.g. spray-painting, the oxyfluorinated surface with one of the following paints:

a single-component base coat in an organic solvent; followed by a clear two-component (top) coat in an organic solvent; or a two-component pigmented top coat in an organic solvent or diluent.

A resin- and a hardener- (or catalyst) component of a two-component polyurethane or epoxy paint are typically contained in two separate containers. When the paint is required for spray painting the resin and the hardener are mixed in a specified ratio and then thinned to a spraying viscosity. This paint mixture has a limited lifetime, usually a few hours. Single-component paints do not require or employ a hardener, and only need to be thinned to spraying viscosity.

With regard to the product of the process of the present invention, this extends to a solid material such as polymeric material, whenever coated by a coating adhesively bonded thereto. The product of the process of the present invention also extends to a composite material, structure and/or artifact which comprises a set matrix, such as a cementitious matrix, strengthened or reinforced by reinforcing material to which the cementitious matrix is adhesively bonded, the matrix comprising a settable, e.g. cementitious, component which has set in contact with a reinforcing component to form a matrix in contact with a reinforcing material comprising said reinforcing component, which matrix adheres thereto, by means of an adhesive bond, the reinforcing component having an oxyfluorinated surface to which the cementitious matrix adheres, the surface of the reinforcing component having been activated and oxyfluorinated in accordance with the process of the present invention.

Figure 2:
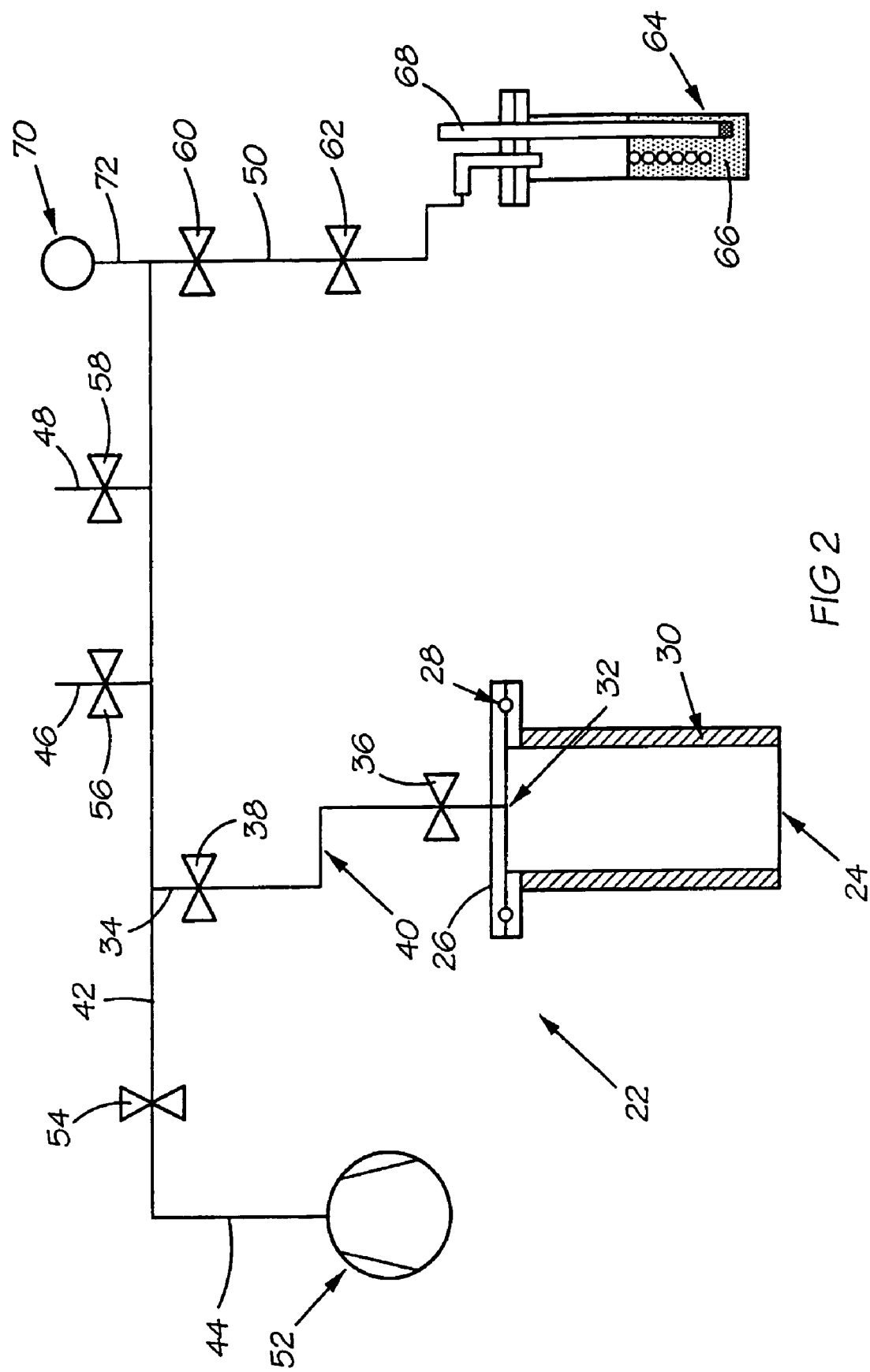

The invention will now be described, by way of illustrative example, with reference to the following Examples and with reference to the accompanying diagrammatic drawings, in which:

FIG. 1 shows a three-dimensional view of a test sample used for the fibre pull-out tests described hereunder with reference to Examples 1 and 2; and FIG. 2 shows a diagrammatic flow/block diagram illustrating details of the reactor employed for the coating aspect of the present invention.

REINFORCING OF MATRICES

Example 1—Invention

Monofilament polypropylene fibres were produced by direct extrusion to have a rectangular cross-section nominally of 0.5 mm×1.3 mm, the fibres having a length of 40 mm, a specific gravity of 0.91, a tensile strength of 120 MPa and an elongation at break of 14%. The fibres were loaded under a humid ambient air atmosphere into a vacuum reaction vessel and the vessel was evacuated down to an absolute pressure of 15 kPa. The vessel was then loaded with a dry 20% $F_2$/80% $N_2$ (by volume) gas mixture up to an absolute pressure of 45 kPa at a temperature of 38° C., to form an oxyfluorinating atmosphere in accordance with the process of the present invention. The fibres had their surfaces activated by oxyfluorination by allowing them to remain exposed to and in contact with the activating atmosphere in the vessel for 2.5 hours at 38° C., after which the vessel was flushed with ambient air. During this contact the surfaces of the polypropylene fibres were activated by oxyfluorination, in the presence of water vapour, by oxygen from the air at 15 kPa remaining in the vessel after the evacuation, and by fluorine from the $F_2$/$N_2$ gas mixture added to said air, the water vapour also being derived from the air at 15 kPa remaining in the vessel after the evacuation. The water vapour provided the oxyfluorinating atmosphere at 45 kPa with a relative humidity of approximately 18%.

Example 2—Control

Example 1 was repeated except that the air at 15 kPa present in the vessel before loading of the $F_2$/$N_2$ gas mixture was replaced by artificial dry air, i.e. a dry mixture of 21% $O_2$/79% $N_2$ (by volume). This was effected by evacuation of the vessel down to a hard vacuum at effectively zero pressure for purposes of practical utility, followed in turn by loading of the $O_2$/$N_2$ mixture into the vessel and loading of the $F_2$/$N_2$ mixture into the vessel, to produce an essentially dry oxyfluorinating atmosphere containing negligible amounts of water vapour.

A highly flowable and readily castable and smoothable mortar slurry mix was prepared by mixing together ordinary Portland cement with dried natural river sand and water, in a cement:water:sand mass ratio of 1:0.52:2. The river sand had a maximum particle size in the range of about 2–4.7 mm and an average particle size in the range of about 0.6–1.5 mm. Mixing was effected manually until the mixture was substantially homogeneous. Fibre pull-out tests were then conducted on dumb-bell-shaped specimens, one of which is indicated by reference numeral 10 in FIG. 1, prepared by casting said mortar slurry mix when fresh into dumb-bell-shaped polymethyl-methacrylate moulds. Each specimen had a thickness T of 20 mm and a maximum width W of 51 mm, and had a waist 12 which divided it into two lobed parts 14. A plastics sheet 16 at the waist 12 separated the parts 14 from each other to prevent bonding therebetween. One of the monofilament fibres, after surface activation, was embedded at 20 in the specimen 10 to extend along the polar axis 18 of the specimen 10, with half (20 mm) of its length embedded in each lobed part 14. The specimen 10 was then allowed to set to form a set cementitious matrix in which the reinforcing component formed by the fibre 20 was embedded, adhesive cementitious bonding taking place between the fibre 20 and the matrix. The cast specimens were cured respectively for 7 and 28 days in water at a temperature of 21–25EC. The strength of the adhesive interfacial shear bond between the fibre 20 and the cementitious matrix was in each case measured using a tensile testing machine equipped with a 500N transducer and a data-logging system, operating at a pull-out rate of 2 mm/minute. The interfacial shear bond strength was calculated by dividing the maximum shear bond force attained by the bonding area of the fibre, i.e.:

$$\text{Interfacial shear bond strength} = \frac{\text{maximum shear bond force}}{2 \times \text{fibre length} \times (\text{width} + \text{thickness})}$$

The units of the shear bond force and length were selected so that the interfacial shear bond strength was obtained in MPa. The fibre pullout test results are presented in the following table, Table 1, for fibres produced by both Example 1 and Example 2, and in each case after 7 and 28 days' curing time respectively, five specimens being tested in each case.

TABLE 1

|  | Shear bond strength (MPa) (7 days' curing) | Shear bond strength (MPa) (28 days' curing) |
|---|---|---|
| Example 1 | 0.40 | 0.33 |
|  | 0.49 | 0.45 |
|  | 0.58 | 0.55 |

TABLE 1-continued

|  | Shear bond strength (MPa) (7 days' curing) |  | Shear bond strength (MPa) (28 days' curing) |
|---|---|---|---|
|  | 0.50 |  | 0.46 |
|  | 0.44 |  | 0.50 |
| Average | 0.48 | Average | 0.46 |
| Example 2 | 0.42 |  | 0.33 |
|  | 0.39 |  | 0.39 |
|  | 0.48 |  | 0.38 |
|  | 0.35 |  | 0.40 |
|  | 0.37 |  | 0.44 |
| Average | 0.40 | Average | 0.39 |

From Table 1 it emerges that the average interfacial bond strengths of the fibres treated according to Example 1 (Invention) were 0.48 MPa and 0.46 MPa respectively after 7 and 28 days' curing. The corresponding values for Example 2 (Control) were respectively 0.40 MPa and 0.39 MPa, respectively showing an increase of 20% after 7 days' curing and of 18% after 28 days' curing, compared with the control.

Example 3—Invention

Example 1 was repeated using polypropylene fibres which were formed from fibrillated polypropylene tape produced by extrusion followed by a fibrillation process. The fibres had a nominal rectangular cross-sectional profile or outline of 0.097 mm×7.5 mm, being 36 mm in length, with a specific gravity of 0.91, a tensile strength of 128 MPa and an elongation at break of 5.3%.

Example 4—Control

Example 2 was repeated using the fibrillated fibres of Example 3.

A proprietary cementitious mixture, Concor HT Wetcrete, obtained from Concor Technicrete (Proprietary) Limited, of 13 Church Street, Crown Industrial Area, Johannesburg, South Africa was prepared to form a shotcrete mixture and was admixed with fibrillated fibres whose surfaces had been activated in accordance with Examples 3 and 4 respectively.

The constituents of the mixture, including the aggregate and fibres, were admixed until substantially homogeneous in a mechanical mixer which was connected to a spray nozzle by means of a peristaltic conveyor system. The proportion of fibres admixed with the shotcrete amounted to 9 kg fibres/m³ shotcrete. As soon as the mixture became homogeneous (i.e. after it was mixed for a period of about 4 minutes) it was passed along the peristaltic conveyor system and sprayed through the spray nozzle into a mould to spray-cast a square panel or slab having sides of 600 mm and a thickness of 100 mm. After the spray casting, the panel or slab was left in the mould under ambient air for 3 days, after which the panel or plate was water-cured for 25 days before energy-absorption tests were conducted on the panel or plate.

The energy-absorption tests were carried out by supporting each panel or plate along its 600 mm edges while centre-point-loading was applied thereto over a central square area having sides of 100 mm, respectively parallel to the 600 mm sides of the panel or plate. The load was applied to the face of each panel or plate opposite to the direction from which the mixture arrived in the mould from the spray nozzle, i.e. the load was applied to the face of the panel or slab which, during the spray-casting, had rested on and abutted on the 600 mm×600 mm floor of the mould which faced upwardly, the spraying taking place downwardly from the spray nozzle into the mould and on to the floor.

The panel or slab containing the fibres whose surfaces had been surface-activated in accordance with Example 3 was found to display a total energy absorption of 1096 joules(J), whereas the control panel or slab whose fibres had been surface-activated in accordance with Example 4 was found to display a total energy absorption of 688 J, i.e. the use of the activation atmosphere of Example 3 led to an increase of 59% in energy absorption of the panel or slab, compared with Example 4. Furthermore, while the load-bearing capacity over a deformation range of 5–25 mm of the latter panel or slab was found to decrease from 67 kN, progressively to a value of 7 kN, i.e. by a factor of 9.6, the load-bearing capacity over the same deformation range of the former was found to decrease at a slower rate from 54 kN, progressively over the same deformation range to a value of 26 kN, i.e. by a factor of only 2.1. Thus, in additon, the panel or slab containing fibres activated in accordance with Example 3 (invention) had a 3.7 times higher residual load-bearing capacity than the control panel or slab whose fibres had been activated in accordance with Example 4.

Coating of Materials

With regard to Examples 5–10 set out hereunder, a reactor-grade thermoplastic olefin (RTPO) SP 179-22 manufactured by Basell Polyolefins Company N.V., Woluwe Garden, Woluwedal 24, B-1932 Zaventem, Belgium, was used, except where other polymers are specified. This RTPO consists of isotactic polypropylene polymerized together with a reactor-made ethylene-propylene rubber (EPR).

Various oxyfluorination atmospheres were used. Degreasing of the materials took place before oxyfluorination by first washing with water and a detergent before rinsing with water, followed in some cases by wiping with isopropanol. In this regard the Applicant has found that the nature of the detergent was not critical, and a number of household detergents were found to be suitable. The fluorination took place at room temperature, typically 25° C., for various periods of time. In each case the treated surface, after drying if necessary, was painted.

In the tests whose results are set out in Tables 2, 3 and 4 hereunder, the following paint was applied:

A single-component polyurethane base coat in an organic solvent, obtained from Herberts (France) S. A., B. P. 1025, 78205, Nantes, La Jolie, Cedex, France, was used as a pigmented base-coating paint with the trade designation HERBERTS BN RG/PERSAN 777, RN 313.565 (Ref. No. FA 9211036) followed by a two-component unpigmented clear coat paint with the trade designation VERNIS 2-K EC 510027 (Ref. No. 9213226/FA 9213227) and a hardener designated FA 9212586. In each case two layers of base coat, each layer being at least 2 µm thick and the thickness of the layers amounting in total to at most about 15 µm thickness, were applied to the sample, followed by two layers of clear (top) coat, each of about 15–40 µm thickness. Each of the base coat layers was allowed to dry by leaving it exposed to air at room temperature for a period of 3–12 minutes, before the following layer was applied; and each layer was applied by spray-painting. The final layer was allowed to dry for 10 minutes and then baked at 80° C. for 30 minutes. The final layer was exposed to the air at room temperature for a period of 3 days before the pull-off tests were performed.

In the tests whose results are set out in Tables 5 and 6 hereunder the following paint was applied:

A two-component polyurethane pigmented topcoat obtained from Dulux AECI Paints (Proprietary) Limited, ALRODE, 1451, Gauteng Province, South Africa. This white-pigmented topcoat paint with the trade designation DUCO DURATHANE K Enamel Cathkin White/Wit (Ref. No. D 928-0025) and a hardener designated Slow D 928–0809 were used. In each case four layers of the two-component topcoat were applied, amounting to approximately 50 μm in total thickness. After the application of each layer, a flash-off period of 3–12 minutes was allowed before the following layer was applied. The final layer was allowed to dry for 10 minutes. The final layer was exposed to the air at room temperature for a period of 3 days before the pull-off tests were performed.

Water contact angles were measured, using a Cahn DC A 322 instrument obtained from MET Systems, 3 Gaiety Street, Robindale, Randburg, Gauteng Province, South Africa. The advancing and receding angles were measured as described in the Cahn DCA operating manual, using a stage speed of 50 μm/s.

Adhesion of the paint to the sample was tested by adhesively securing metal-backed test pads to the painted sample, using a cyanoacrylate adhesive available from Loctite (South Africa) (Proprietary) Limited under the trade designation of LOCTITE 496 CYANOACRYLATE. Pull-off adhesion strength was tested in accordance with International ISO Standard 4622–1978(E), using a 20 mm diameter test cylinder adhesively secured to the painted surface using said Loctite 496. The test cylinders were pulled from the painted test samples by means of a tensile tester, the force in Newtons (N) required to break the test assembly was recorded together with the standard deviation. The breaking strength in megaPascals (MPa) is given by F/314, where F is the breaking force in Newtons, and the test cylinders were 20 mm in diameter. The fracture surfaces were examined and the results were expressed as the percentage area and in terms of the site of the fracture, expressed in terms of adhesive-, cohesive- or adhesive/cohesive failure. In Tables 4–9 the following scheme was used to describe the site of fracture:

A=Cohesive failure of the sample material
A/B=Adhesive failure between sample material and first coat
B=Cohesive failure of first coat
B/C=Adhesive failure between first and second coats
–/Y=Adhesive failure between final coat and adhesive.

In Examples 5–10 a single-component paint is referred to as a 1-K paint, and a two-component paint is referred to as a 2-K paint.

Example 5

Samples in the form of plates made of the RTPO SP 179-22 having dimensions of 10 cm×10 cm were exposed to an oxyfluorinating atmosphere at 25° C. in a reaction vessel after evacuating air from the vessel to a residual air pressure of 25 kPa. The oxyfluorinating atmosphere was formed in the vessel at a total pressure of 30 kPa. The charged vessel contained a gas/vapour mixture made up of humid ambient air with a partial pressure of 25 kPa, and of an $F_2/N_2$ gas mixture at a partial pressure of 5 kPa, the $F_2/N_2$ mixture comprising 20% by volume $F_2$ and 80% by volume $N_2$. This gas mixture will be referred to hereunder as '5 kPa 20% $F_2/N_2$/25 kPa air mixture'. Oxyfluorinating times were varied from a minimum of 5 seconds up to a maximum of 1 hour (3600 seconds), to obtain various different surface concentrations of fluorine on the treated surface. Two layers of Herberts BN RG Persan base coat were applied followed by two layers of clear coat. The four layers had an approximate thickness of 52 μm. The painting took place after exposing the oxyfluorinated samples for 24 hours at 25° C. to humid ambient air to hydrolyse the oxyfluorinated surfaces. The standard deviation measured during the evaluation of the paint adhesion strength was about 1.4 MPa. Results are set forth in the following table, Table 2.

TABLE 2

SP 179-22 material exposed at 25° C. to 5 kPa 20% $F_2/N_2$/25 kPa air mixture painted with Herberts Persan 1-K base coat/2-K clear coat, after exposing the surface to humid ambient air for 24 h.

| Oxyfluorinating time (seconds) | Breaking force (MPa) | Nature of failure (%) | Fluorine concentration (μgF/cm$^2$) | Water contact angle advance/recede (°) |
|---|---|---|---|---|
| 0 | 0 | 100A/B | 0 | 108.7/77.0 |
| 5 | 5.39 | 60A, 40A/B | 2.9 | 92.1/51.7 |
| 10 | 4.84 | 80A, 20A/B | 2.9 | 91.2/43.8 |
| 15 | 5.06 | 90A, 10A/B | 3.0 | 75.5/34.2 |
| 60 | 6.59 | 100A | 3.2 | 63.4/25.8 |
| 300 | 6.74 | 100A | 3.8 | 56.5/19.9 |
| 900 | 6.25 | 80A, 20A/B | 4.3 | 43.9/15.4 |
| 1800 | 6.54 | 100A | 4.8 | 65.5/20.2 |
| 3600 | 6.64 | 80A, 20A/B | 6.4 | 67.7/20.5 |

From Table 2 it is clear that excellent surface activation and paint adhesion were obtained from a 5 second exposure time onwards and that no decrease in the adhesion strength was observed for longer times, even after 1 hour of oxyfluorination. Although very little change in the amount of surface-incorporated fluorine was observed, initial changes in the water contact angle were sensitive measures for adequate activation. A surprisingly small amount of fluorine was incorporated in the surface.

Example 6

Example 5 was repeated except that the painted samples were immersed in water at 40° C. for 10 days before the paint adhesion strength was evaluated. The standard deviation in the breaking force was about 2,0 MPa. Results are set forth in the following table, Table 3:

TABLE 3

SP 179-22 material exposed at 25° C. to 5 kPa 20% $F_2/N_2$/25 kPa air mixture painted with Herberts Persan 1-K base coat/2-K clear coat after 24 hours exposure to air, followed by 10 days of immersion in water at 40° C.

| Oxyfluorinating time (seconds) | Breaking strength (MPa) | Nature of failure (%) |
|---|---|---|
| 5 | 5.10 | 90A, 10A/B |
| 10 | 6.90 | 100A |
| 15 | 6.59 | 100A |
| 60 | 5.89 | 100A |
| 300 | 8.21 | 100A |
| 900 | 11.61 | 100—/Y |
| 1800 | 7.97 | 100—/Y |
| 3600 | 4.38 | 100A |

From comparing the paint adhesion strength before water immersion (Table 2) to that after immersion (Table 3), it was clear that no decrease arising from the immersion was observed. In fact, an increase was generally observed.

Example 7

Using the same material, oxyfluorination and painting conditions as for Example 5, but with an oxyfluorinating time of 10 seconds, the influence of different partial pressures of fluorine was investigated. The results are summarized in Table 4 hereunder.

From Table 4 one can deduce that a partial pressure of 1 kPa of $F_2$ (5 kPa 20% $F_2/N_2$/25 kPa air mixture) is adequate to induce excellent adhesion strength.

TABLE 4

Material SP 179-22 exposed at 25° C. to various mixtures of $F_2/N_2$ and air with the air at 25 kPa and the $F_2/N_2$ at various different pressures for 10 seconds and then painted with Herberts Persan 1-K base coat/2-K clear coat after exposure to air for 24 hours.

| Pressure of 20% $F_2/N_2$ added to 25 kPa Air Mixture (kPa) | Breaking Strength (MPa) | Nature of Failure (%) | Water Contact Angle (°) Advance/Recede |
|---|---|---|---|
| 1 | No adhesion | No adhesion | 100/72.9 |
| 2 | No adhesion | No adhesion | 100/58.0 |
| 5 | 7.09 | 10A, 90A/B | 64.8/30.5 |
| 10 | 6.54 | 100—/Y | 68.7/29.3 |
| 20 | 8.62 | 40A/B, 60—/Y | 60.5/20.2 |
| 30 | 11.38 | 100—/Y | 59.7/24.4 |
| 40 | 9.44 | 100—/Y | 62.2/23.2 |

Example 8

As for Example 5, all SP 179-22 plate samples were oxyfluorinated for 10 seconds using 5 kPa 20% $F_2/N_2$/25 kPa air mixture, at different temperatures. The paint adhesion of the samples was evaluated after 10 days of water immersion at 40° C. The results are summarised in Table 5. From Table 5 it is clear that good adhesion was obtained over a wide oxyfluorination temperature range, but that adhesion decreased substantially when oxyfluorinating near the melting temperature (169° C.) of the plastic substrate. Comparing the 70.3° contact angle at 150° C. with that of Table 2, it was to have been expected that excellent adhesion would be achieved. This indicates that contact angle changes are not sufficient to predict adequate adhesion after water immersion.

TABLE 5

Material SP 179-22 oxyfluorinated at a number of different temperatures by exposure to 5 kPa 20% $F_2/N_2$/25 kPa air mixture for 10 seconds and then painted with Dulux Cathkin White after exposure to air for 24 hours.

| Oxyfluorination temperature (° C.) | Breaking strength (MPa) | Nature of failure (%) | Fluorine Concentration ($\mu gF/cm^2$) | Water contact angle (°) advance/recede |
|---|---|---|---|---|
| 25 | 7.66 | 10A, 90A/B | 2.7 | 63.0/34.6 |
| 50 | 9.24 | 10A, 90—/Y | 2.9 | 60.8/34.1 |
| 100 | 7.60 | 50A, 50A/B | 3.2 | 53.5/32.2 |
| 150 | No adhesion | No adhesion | 2.9 | 70.3/37.1 |

Example 9

Using the same oxyfluorination conditions as for Example 5 but fixing oxyfluorinating time at 10 seconds and using a 5 kPa 20% $F_2/N_2$/25 kPa air mixture, an SP 179-22 sample was oxyfluorinated. Instead of waiting for 24 hours before painting, the sample was painted with Dulux Cathkin White after exposure to the atmosphere, on the one hand, 600 seconds after oxyfluorination, and, on the other hand, 7 months after fluorination. The paint adhesion was evaluated after the painted sample was submerged for 10 days at 40° C. in water—See Table 6, Samples Nos. 1 and 2 hereunder.

Comparing the adhesion strength with that of a sample painted after 24 hours after oxyfluorination (e.g. adhesion strength of 7,66 MPa at 25° C. in Table 5) it is clear that paint adhesion strength was not influenced by the hydrolysis time of the substrate before painting.

Painting the oxyfluorinated sample after 7 months of exposure to the atmosphere had no detrimental effect on adhesion strength, as is apparent from a comparison of the respective breaking strength values of 6.7 MPa and 6.8 MPa, respectively of Sample 1 for 600 seconds and Sample 2 for 7 months in Table 6 hereunder. This result shows that surface oxyfluorination can be regarded as permanent.

To determine whether or not the paint adhesion strength deteriorates with time, an SP 179-22 sample, Sample 3 in Table 6 hereunder, was oxyfluorinated in the same fashion as for Samples 1 and 2. Sample 3 was exposed to air for 24 hours after oxyfluorination, before being painted with Herberts Persan 1-K base coat followed by a 2-K polyurethane clear coat (see paint system (a) in Example 7 hereunder). After one year's exposure to the laboratory atmosphere the paint adhesion strength was determined and a value of 10.3 MPa was obtained (see Sample 3 in Table 6) indicating that no loss in paint adhesion strength took place after one year. Indeed, samples submerged for 3 months in water at 50° C., did not show any decrease in paint adhesion strength.

TABLE 6

Material SP 179-22 exposed at 25° C. to a 5 kPa 20% $F_2/N_2$/25 kPa air mixture for 10 seconds, and then painted with Dulux Cathkin White and evaluated after different exposure times.

| Sample No | Breaking strength (MPa) | Nature of failure (%) | Fluorine Concentration ($\mu gF/cm^2$) | Water contact angle (°) advance/recede |
|---|---|---|---|---|
| 1 | 6.7[1] | 10A, 90A/B | 2.5 | 63.1/34.6 |
| 2 | 6.8[2] | 20A, 50A/B, 30—/Y | Not measured | Not measured |
| 3 | 10.3[3] | 100—/Y | Not measured | Not measured |

[1] Painted 10 minutes after surface oxyfluorination
[2] Painted 7 months after surface oxyfluorination
[3] Breaking strength evaluated one year after painting

Example 10

For this example a number of different polyolefin materials, known to be difficult to paint, were oxyfluorinated and painted with a variety of different paints. The following substrates were oxyfluorinated:

(a) A reactor-grade polypropylene SP 179-22 manufactured by Montell and obtained from Bruneal Plastics (Proprietary) Limited, PO Box 289, Lonehill 2062, Gauteng Province;

(b) A block copolymer manufactured by Plastomark (Proprietary) Limited of Highchem Park, 16 th Road, Midrand, Gauteng Province, Republic of South Africa;

(c) A polypropylene homopolymer from Polifin Limited, PO Box 72, Modderfontein, 1645, Republic of South Africa;

(d) A random or statistical polypropylene copolymer called Stat from Plastomark (Proprietary) Limited;

(e) A high-density polyethylene (HDPE) manufactured by BASF South Africa (Proprietary) Limited, 852, 16th Street, Midrand (Designation Lupolen 526125).
(f) A linear low-density polyethylene manufactured by Polyfin Limited (Rotational moulding grade 3185).

Samples of these olefin materials were oxyfluorinated by exposing them at 25° C. to a partial pressure of 5 kPa 20% $F_2/N_2$/25 kPa air mixture for 10 seconds and then painting them after 24 hours exposure to air with the following paints by spray-painting the surface to apply one of the following paint systems:

(a) A 1-K polyurethane base coat with the trade designation Herberts BN RG Persan 777 RN (RN 313. 565) followed by a 2-K polyurethane clear (top) coat with the trade designation VERNIS 2-K EC 510027 (Ref. No. 9213226/FA 9213227) and a hardener (Ref. No. FA 9212586).
(b) A 2-K topcoat with the trade designation DUCO DURATHANE K ENAMEL Cathkin White (Ref. No. D 928-0025) obtained from Dulux (Proprietary) Limited, PO Box 911641, 117 Phillips Street, Rosslyn, Pretoria, Gauteng Province.
(c) An Epoxy 2-K paint with the trade designation Dulux Hi Chem Epoxi-Emalje Brilliant Green (Ref. No. D 355-0221) and a hardener (Ref. No. 39490) obtained from Dulux (Proprietary) Limited.
(d) A 1-K water-borne base coat (WBC), followed by the 2-K clear coat mentioned in (a) above, from Herberts.
(e) A 2-K soft-touch coat, trade designation Karl Wörwag, Wöropur-Softfeellack Schwartz Nach Matt (Ref. No. 64090) mit Hartner (Ref. No. 57859) obtained from Karl Wörag Lack-und Farbenfabrik GmbH & Co, Strohgän Strasse 28, 70435 Stuttgart, Germany.
(f) A 1-K primer trade designation Plascon 1-K A/Dry H/Build Pd for P/Propyl. EPDM obtained from Plascon (Herberts), PO Box 1594, Port Elizabeth 6000, Eastern Cape Province, Republic of South Africa.

From Table 7 hereunder it can be seen that oxyfluorinations ((a)–(f)) generally led to improved paint- and primer adhesion when compared to the adhesion of a primer on a surface that had not been oxyfluorinated. Polymers containing propylene (RTPO SP 179, block copolymer, homopolymer, and random copolymer) showed better adhesion than those containing only ethylene (HDPE, LLDPE). The adhesion of paints applied directly to an oxyfluorinated surface was in most cases equal or better than the adhesion of primers on an oxyfluorinated surface.

It should be noted that the water-based or water-borne base coat (d) could be applied directly to the oxyfluorinated surface without first applying a primer. Thus, the use of adhesion promoters is not necessary when substrates are oxyfluorinated before paint application. This can eliminate the cost of applying expensive, environmentally unfriendly primer coats. This fact, as well as the excellent adhesion obtained on an oxyfluorinated sample with a water-borne base coat, can significantly reduce painting costs and reduce health risks for workers applying paints.

The soft-touch paint ((e) in Table 7) showed excellent adhesion to polypropylene-containing polymers. Soft-touch paints are generally applied to highly isotactic polypropylene block copolymers used for the interior trims and dashboards of motorcars. From Table 7 it can be seen that the adhesion of the soft-touch paint was excellent on the block copolymer.

TABLE 7

Various olefin polymers exposed at 25° C. to 5 kPa 20% $F_2/N_2$/25 kPa air mixtures for 10 seconds and then painted after 24 h with various paints. (g) Shows the breaking strength of the primer when applied to the various olefins not oxyfluorinated.

| Paint Type | Manufacturer | RTPO SP 179-22 Breaking strength MPa | RTPO SP 179-22 Nature of failure (%) | Block copolymer Breaking strength MPa | Block copolymer Nature of Failure (%) | Homopolymer Breaking strength MPa | Homopolymer Nature of failure (%) |
|---|---|---|---|---|---|---|---|
| (a) 1-K base/2-K clear polyurethane | Herberts | 4.7 + 1.4 | 90A, 10A/B | 9.5 ± 2.4 | 100-/Y | 6.9 ± 2.2 | 100A |
| (b) Polyurethane 2-K top coat | Dulux | 6.7 ± 2.0 | 10A, 90A/B | 13.4 ± 2.1 | 10A, 90-/Y | 10.4 ± 4.0 | 100A/B |
| (c) Epoxy 2-K | Dulux | 6.9 ± 0.8 | 100B/C | 7.3 ± 0.6 | 100B/C | 7.8 ± 1.3 | 100B/C |
| (d) WBC/2-K clear | Herberts | 6.8 ± 2.1 | 100A/B | 9.8 ± 1.1 | 50B, 50A/B | 5.2 ± 1.5 | 100B/C |
| (e) Soft touch | Wörwag | 5.0 ± 1.5 | 20A, 30A/B 50-/Y | 7.4 ± 1.7 | 100-/Y | 7.8 ± 1.6 | 60A, 4-/Y |
| (f) 1-K Primer/polyurethane 2-K top coat | Plascon/Dulux | 5.3 ± 1.2 | 70A, 30A/B | 5.4 ± 0.6 | 100A/B | 4.9 ± 1.1 | 100A/B |
| (g) Same as (f), but substrates unfluorinated | Plascon/Dulux | 2.8 ± 0.5 | 100A/B | 1.1 ± 0.2 | 100A/B | 3.23 ± 1.0 | 100A/B |

| Paint Type | Random copolymer Breaking strength MPa | Random copolymer Nature of failure (%) | HDPE Breaking strength MPa | HDPE Nature of failure (%) | LLDPE Breaking strength MPa | LLDPE Nature of failure (%) |
|---|---|---|---|---|---|---|
| (a) 1-K base/2-K clear polyurethane | 5.5 ± 0.6 | 100A | 4.2 ± 1.0 | 100A/B | 2.1 ± 0..3 | 100A/B |

TABLE 7-continued

Various olefin polymers exposed at 25° C. to 5 kPa 20% F$_2$/N$_2$/25 kPa air mixtures for 10 seconds and then painted after 24 h with various paints. (g) Shows the breaking strength of the primer when applied to the various olefins not oxyfluorinated.

| | | | | | | | |
|---|---|---|---|---|---|---|---|
| (b) Polyurethane 2-K top coat | 6.1 ± 2.4 | 20A 80A | 2.5 ± 1.4 | 100/B | 1.5 ± 0.6 | 100A/B | |
| (c) Epoxy 2-K | 5.7 ± 0.2 | 100A | 3.3 ± 1.0 | 100A/B | 1.8 ± 0.6 | 100A/B | |
| (d) WBC/2-K clear | 6.1 ± 2.4 | 20A, 80A/B | 4.4 ± 1.0 | 100A/B | 1.8 ± 0.4 | 100A/B | |
| (e) Soft touch | 8.5 ± 2.8 | 20A/B 80-/Y | 3.3 ± 0.8 | 100A/B | 1.3 ± 0.3 | 100A/B | |
| (f) 1-K Primer/polyurethane 2-K top coat | 5.06 ± 0.7 | 100A/B | 3.8 ± 1.2 | 100A/B | 1.7 ± 0.2 | 100A/B | |
| (g) Same as (f), but substrates unfluorinated | 3.1 ± 1.0 | 100A/B | 1.2 ± 0.2 | 100A/B | 0.9 ± 0.2 | 100A/B | |

From the results in the Examples 5–10 it appears that the process of the present invention is capable of producing products with regard to which substantial breaking forces are required to break the bond between the oxyfluorinated surface of the sample, and the first or lowermost paint layer applied thereto. Typically failure takes place either under the oxyfluorinated surface, in the material of the sample, or at the outer surface of the paint, at the interface between the paint and the adhesive. In none of the tests was more than 40% of the site of the failure made up of adhesive failure between the oxyfluorinated sample surface and the first or lowermost coat of paint. Furthermore in each of Examples 5–10, depending on the exposure times, results could be achieved where no such adhesive failure at the sample/paint interface took place.

In particular it is to be noted that the humid ambient air (usually between 30% and 70% relative humidity) of the 5 kPa 20% F$_2$/N$_2$/25 kPa air mixture employed in Examples 5–10 contained sufficient humidity for the 5 kPa 20% F$_2$/N$_2$/25 kPa air mixture to have a moisture content in terms of water vapour of 2–10 mg/L.

Further tests, as set forth hereunder in Examples 11–13, were carried out to compare dry oxyfluorination with oxyfluorination using the gas/vapour mixture oxyfluorinating atmosphere of the present invention, containing water vapour. In Examples 11–13, the polypropylene homopolymer used was that listed under (c) in Example 10 above, and a rotational moulded linear low-density polyethylene (LLDPE) obtained from Sasol Polymers, a division of Sasol Limited, Johannesburg, under the trade designation Reference LLDPE HR 486/06.

Sample preparation was done in accordance with that described above for Examples 5–10 except that, instead of wiping with isopropanol, the samples were left to dry overnight. The paint used was the DUCO DURATHANE K ENAMEL Cathkin White/Nit (Ref. No. D 928-0025) top coat paint/Slow D 928-0809 hardener combination from Dulux AECI Paints (Proprietary) Limited referred to above. When an epoxy adhesive is referred to in Examples 11–13 it is that available from Pratley Manufacturing & Engineering Company (Proprietary) Limited, Factoria, Krugersdorp, P.O. Box 3055, Kenmare 1745 Gauteng Province, South Africa, under the trade designated Pratley Quickset White Epoxy Glue, which was used in accordance with the manufacturer's instructions. Adhesion was evaluated using the metal-backed test pads to measure pull-off and adhesion strength using a 20 mm diameter test cylinder according to International ISO Standard 4622-1978(E) as described above. Samples in the form of 10 cm×10 cm plates of the polymers described in Examples 11–13 were exposed to various oxyfluorinating gas/vapour mixtures according to the invention at 25° C. in a reaction vessel. The atmospheric relative humidity of the ambient air used was 50–70% during the course of carrying out Examples 11–13.

The apparatus of FIG. 2 was used to create a gas/vapour mixture as an oxyfluorinating atmosphere having a desired relative humidity in a reaction vessel.

In particular a humid oxyfluorination atmosphere of about 75% relative humidity and a dry oxyfluorination atmosphere of substantially 0% relative humidity were created.

In FIG. 2, the apparatus employed is generally designated by reference numeral 22. The apparatus comprised a reactor in the form of a stainless steel reaction vessel 24 shown provided with a lid 26 sealed by means of an O-ring 28. The reaction vessel 24 was provided with a heater jacket 30, and was connected via an inlet/outlet opening 32 in a lid 26 therefor, to a fluid flow line 34. The flow line 34 was provided with a pair of shut-off valves, respectively designated 36 and 38, joined together by a flexible metal bellows 40.

Flow line 34 branched from a manifold 42, to which were connected a plurality of flow lines respectively designated 44, 46, 48 and 50.

Flow line 44 led to a vacuum pump 52, and was separated from the remainder of the manifold 42 by a shut-off valve 54. Flow lines 46, 48 and 50 entered the manifold 42 on the same side of the valve 54 as the flow line 34, i.e. remote from the flow line 44.

Flow line 46, provided with a regulating valve 56 was a supply line for a mixture of F$_2$/N$_2$; and flow line 48, provided with a regulating valve 58 was a dry synthetic air supply line. In turn, the flow line 50 was provided with a shut-off valve 60 and a regulating valve in the form of an adjustable needle valve 62 and led to a gas-wash bottle 64, containing water 66 and provided with an air inlet pipe 68. Finally, a pressure transducer 70 was shown connected to the manifold 42 by a pressure line 72.

In other words the reactor 24 was a stainless steel vessel sealed by the O-ring 28. The temperature in the reactor was controlled by the heater jacket 30. For convenience valves 36 and 38 were joined by the flexible metal bellows 40. The glass gas-wash bottle 64 containing water 66 was used to humidify the air loaded into the fluorination reactor 24. Two valves 60, 62 were used at the point where the humidified air from the gas-wash bottle 64 was admitted to the manifold 42. Valve 62 was an adjustable needle valve that was set to deliver humidified air to the evacuated reactor 24 at a rate which resulted in a level of humidity of at least 75% relative humidity. Valve 60 was a shut-off valve, which was used to admit/shut-off the humid air flow into the manifold 42 and the reactor 24.

Vacuum pump 52 was connected to manifold 42 via the normally closed valve 54 and was used to evacuate the manifold 42 and reactor 24 before each run. The pressure transducer 70 constantly measured the pressure in the manifold 42 and reactor 24 of the apparatus 22 to control the steps of evacuation of the reactor 24 and subsequent loading of gas components from flow lines 46, 48 and 50. Valve 58 admitted the $F_2/N_2$ mixture via line 46 to the manifold 42 and was used to admit and regulate the loading of the $F_2/N_2$ mixture before the oxyfluorination process. During humid oxyfluorination air/water vapour mixture from gas-wash bottle 64 was loaded via the manifold 42 into the reactor 24 by opening valve 60 and adjusting valve 62 to achieve a desired loading rate. Instead, for dry oxyfluorination, dry synthetic air from a synthetic air cylinder (not shown) attached to supply line 48 using a flexible metal hose (also not shown) was fed via its own flow regulation valve (not shown) and valve 58 into the manifold 42. The synthetic air was purchased from Air Products (Proprietary) Limited, Kempton Park with the following specification:

a) Oxygen—20–22% by volume
b) Nitrogen—the balance
c) Water—less than 2 ppm

Humid Oxyfluorination Procedure

In operation the temperature of the reactor 24 was regulated at about 1–2° C. above ambient temperature by means of the heater jacket 30. The actual recorded temperatures during the test runs fluctuated between 25° C. and 30° C. Initially valves 36, 38, 60, 54, 58 and 56 were closed and the test samples were loaded into the open reactor 24. The lid 26 of the reactor 24 was then closed and sealed by means of O-ring 28. Valves 54, 36 and 38 were then opened and the manifold 42 and reactor 24 of the apparatus 22 were evacuated to as low pressure as possible whereafter valve 54 was closed. Valve 60 was then opened and humid air was admitted into the manifold 42 and reactor 24 at a desired rate by means of needle valve 62 to allow air of about 75% or more relative humidity into the reactor 24 up to a specified pressure. Valve 60 was then closed. The $F_2/N_2$ mixture from line 46 was then admitted up to a specified pressure in the manifold 42 and reactor 24, by slowly opening valve 56. Thereafter, valves 56, 38 and 36 were closed for the duration of the humid activation.

The test samples were left in contact with the gas mixtures for specified periods of time. Valves 54, 38 and 36 were then opened and the gases in the reactor 24 pumped off. Valve 54 was then closed and air from the atmosphere was admitted to the manifold 42 and reactor 24 by opening valve 60. When the pressure in the manifold 42 and reactor 24 reached about 80 kPa, valve 60 was closed and valve 54 was opened to allow pump 52 to pump air out of the manifold 42 and reactor 24. This cycle of evacuation and flushing with air was repeated three times in order to remove any residual fluorine and hydrofluoric acid from the reactor 24. Finally, air was allowed into the reactor 24 through valve 60 up to atmospheric pressure whereafter the lid was opened and the test samples removed from the reactor.

Dry Oxyfluorination Procedure

The only difference between dry and humid oxyfluorination was the use of dry synthetic air from the synthetic air bottle attached to line 48, instead of humid air from the gas-wash bottle 64. Special precautions were, however, taken in removing any moisture in the apparatus 22 therefrom, downstream of valve 60 before, during and after the dry oxyfluorination process.

The temperature of the reactor was controlled as before. Valves 36, 38, 60, 54, 58 and 56 were closed as before. Thereafter the apparatus was evacuated, followed by flushing to a pressure of about 80 kPa with dry synthetic air from the air supply connected to line 48 by manipulating valves 54 and 58 in succession. This was repeated three times in order to remove any traces of water from the manifold 42 and reactor 24. Dry air was then bled into the manifold 42 and reactor 24 up to atmospheric pressure, before closing all valves and opening the reactor lid 26. Pre-dried test samples were then quickly loaded into reactor 24, whereafter the reactor lid 26 was replaced and sealed with O-ring 28. A sequence of three successive evacuations, each followed by flushing with synthetic dry air to about 80 kPa, of the manifold 42 and reactor 24 was performed as before, to remove all traces of moisture therefrom. Finally, dry synthetic air was admitted to the manifold 42 and reactor 24 up to a specified pressure via valve 58. Valve 56 was then slowly opened and $F_2/N_2$ mixture admitted to the manifold 42 and reactor 24 to a specified partial pressure. Valves 56, 38 and 36 were then closed for the duration of the dry activation.

The test samples were left in contact with the oxyfluorination atmospheres for specified periods of time. Valves 54, 38 and 36 were then opened and the gases in the reactor 24 and manifold 42 evacuated therefrom by pump 52. The manifold 42 and reactor 24 were then flushed with synthetic dry air and evacuated three times as before to remove all residual fluorine and hydrofluoric acid. Finally, synthetic dry air was allowed to flush the reactor 24 through valve 58 up to atmospheric pressure whereafter the lid 26 was opened and the test samples were removed from reactor 24.

Example 11

Polypropylene homopolymer samples were cleaned and were subjected to dry oxyfluorination in the absence of water vapour, and to humid oxyfluorination in the presence of water vapour. The samples subjected to dry oxyfluorination were left for 24 hours in a silica gel-filled desiccator prior to oxyfluorination, whereas those subjected to humid oxyfluorination were equilibrated in a closed vessel with a relative humidity of $\geq 95\%$ prior to oxyfluorination. All samples were oxyfluorinated for 10 seconds. For the dry oxyfluorination, samples were exposed to an oxyfluorinating gas atmosphere consisting of a $F_2/N_2$ gas mixture at a pressure of 3 kPa, the $F_2/N_2$ mixture comprising 20% by volume $F_2$ and 80% by volume $N_2$, and dry air consisting of an $O_2/N_2$ mixture comprising 21% by volume $O_2$ and 79% $N_2$ by volume, at a pressure of 25 kPa. The total reaction pressure was thus 28 kPa, and the atmosphere comprised 3 parts by volume of the $F_2/N_2$ mixture, mixed with 25 parts by volume of the $O_2/N_2$ mixture. For the humid oxyfluorination the atmosphere was the same, except that the dry air was replaced by air comprising $O_2$ and $N_2$ in the same 21:79 volume ratio, but of 75% relative humidity. The results are set forth in Table 8.

TABLE 8

2-K polyurethane paint adhesion strengths on dry- and humid oxyfluorinated polypropylene samples. Samples were painted within 1 hour of oxyfluorination.

| Dry Oxyfluorination | | Humid Oxyfluorination | |
|---|---|---|---|
| Breaking Strength (MPa) | Nature of Failure | Breaking Strength (MPa) | Nature of Failure |
| 9.88 | 100% A/B | 13.62 | 90%—/Y, 10% A/B |
| 13.82 | 100%—/Y | 9.73 | 90%—/Y, 10% A/B |
| 4.49 | 100% A/B | 11.40 | 90%—/Y, 10% A/B |
| 10.79 | 100%—/Y | 12.18 | 90%—/Y, 10% A/B |
| 7.35 | 50% A/B, 50%—/Y | 13.79 | 100%—/Y |
| Mean 9.3 ± 3.5 | | Mean 12.1 ± 1.7 | |

It was noted that for the dry oxyfluorination the adhesive failure generally occurred between the polypropylene substrate and the paint coating, while for the humid oxyfluorination the failure was between the paint coating and the adhesive, indicating superior paint adhesion to the substrate when humid oxyfluorination was employed. This was emphasised by the significant increase in average breaking strength from 9.26 MPa to 12.14 MPa when dry oxyfluorination was replaced by humid oxyfluorination. This was coupled with a substantial decrease in standard deviation, suggesting that humid oxyfluorination is more homogeneous than dry oxyfluorination, leading to a more reliable activation of the substrate with the potential for better quality control. The nature of the failure for the humid oxyfluorination samples indicated that the A/B bond strength was in fact greater than the average value of 12.14 MPa. Further tests using ambient air showed that a drop from 75% or higher down to 65% relative humidity in the humid oxyfluorination gave a mean breaking strength of 12.43 MPa, which compared favourably with the 12.14 MPa in Table 8 for 75% relative humidity.

Example 12

Example 11 was repeated on rotational moulded linear low-density polyethylene, with an increase of reaction time from 10 seconds to 3 minutes. Results are set forth in Table 9.

TABLE 9

2-K polyurethane paint adhesion strengths on dry - and humid oxyfluorinated linear low-density polyethylene.

| Dry Oxyfluorination | | Humid Oxyfluorination | |
|---|---|---|---|
| Breaking Strength (MPa) | Nature of Failure | Breaking Strength (MPa) | Nature of Failure |
| 0.93 | 100% A/B | 3.05 | 100% A/B |
| 1.91 | 100% A/B | 7.07 | 100% A/B |
| 0.78 | 100% A/B | 5.80 | 100% A/B |
| 1.26 | 100% A/B | 3.81 | 100% A/B |
| 5.86 | 100% A/B | 3.92 | 100% A/B |
| Mean 2.2 ± 2.1 | | Mean 4.7 ± 1.7 | |

With linear low-density polyethylene changing from the dry oxyfluorination to the humid oxyfluorination effectively doubled the breaking strength with a substantial decrease in standard deviation. In each case failure occurred between the polyethylene substrate and the paint coating. As with Example 11, the increase in breaking strength achieved by humid oxyfluorination was substantial.

Example 13

Example 11 was repeated except that the paint coating of Example 11 was replaced by a coating of Pratley Quickset White Epoxy Glue. Results are set forth in Table 10.

TABLE 10

Pratley Quickset White Epoxy Glue adhesion strength on polypropylene homopolymer.

| Dry Oxyfluorination | | Humid Oxyfluorination | |
|---|---|---|---|
| Breaking Strength (MPa) | Nature of Failure | Breaking Strength (MPa) | Nature of Failure |
| 2.76 | 100% A/B | 13.44 | 100% A |
| 5.94 | 50% A/B, 50% A/B | 13.93 | 100% A |
| 13.33 | 100% A | 12.19 | 100% A |
| 5.16 | 50% A/B, 50% A | 13.89 | 100% A |
| 11.18 | 100% A | | |
| Mean 7.07 ± 4.4 | | Mean 13.3 ± 0.8 | |

In Table 10 test results for certain samples were ignored and excluded because of uneven sample surfaces which rendered these test results unreliable. In Table 10 A/B refers to adhesive failure between the polypropylene substrate and the epoxy coating, while A refers to cohesive failure of the substrate. The results shown in Table 10 also confirm that changing from dry oxyfluorination to humid oxyfluorination led to an improvement of breaking strength for adhesive coatings as well as more homogeneous surface activation.

Here the epoxy coating also serves as the adhesive for securing the breaking strength test cylinder to the coating, so that no further adhesive is applied as in the case of paint coatings.

It is believed that the process of the present invention has broad application to a wide variety of solid materials where surface activation, particularly with respect to achieving enhanced adhesion, plays a role. A broad spectrum of materials is known to benefit from dry fluorination or dry oxyfluorination in terms of surface activation or modification, which leads to varying degrees of improved adhesion to flowable or mouldable substances such as glues, dyes, paints, resins, epoxies and various cementitious matrices. It is therefore expected that at least the same spectrum of materials is susceptible to enhanced surface activation or modification by oxyfluorination in the presence of water vapour according to the present invention, so as further to improve their adhesion properties. Thus, it is believed that the present invention can in principle be extended to activation of materials such as natural organic substances including wood, leather, textiles such as cotton and wool, and also to activation of inorganic substances such as metals or metalloids, ceramics, glass, asbestos and carbon. Enhanced activation, particularly with respect to adhesion, is thus expected to follow such oxyfluorination. In particular it is believed that the oxyfluorination of metal reinforcements in cementitious matrices may have the effect of ameliorating corrosion of the metal and thus reducing corrosion and cracking in the matrices.

The invention claimed is:

1. A process for the activation by oxyfluorination of at least part of a surface of a solid, which process includes exposing, under selected conditions of temperature and pressure and for a selected reaction time, at least part of the surface of the material of the solid to an oxyfluorinating atmosphere which is a gas/vapour mixture which includes at least one fluorine-containing gas which reacts with the material of the exposed surface, at least one oxygen-containing gas which reacts with the material of the exposed surface, and water vapour, said gases in the oxyfluorinating atmosphere acting to oxyfluorinate the exposed surface, thereby to activate the exposed surface to enhance the amenability of the exposed surface to adhesive bonding to other materials, the process including the steps whereby, in combination, the solid material which is subjected to activation by oxyfluorination is selected from the group whose members consist of carbon, polymeric materials having constituents which are confined to carbon and hydrogen, elastomeric materials having constituents which are not confined to carbon and hydrogen and which include, in addition to carbon and hydrogen, other atomic species as constituents, and mixtures of any two or more of said members;

the exposing of the solid surface to the oxyfluorinating atmosphere is carried our on a continuous basis by continuously transporting the solid through an open-ended reaction chamber; and the water vapour acts further to enhance the amenability of the exposed surface, provided by the oxyfluorination achieved by said gases, to adhesive bonding to said other materials.

2. A process as claimed in claim 1, which includes selecting carbon as the material which is subjected to activation by oxyfluorination.

3. A process as claimed in claim 1, which includes selecting the fluorine containing gas from the group consisting of $F_2$, $XeF_2$, ClF, $ClF_3$, BrF, $BrF_3$, $BrF_5$, $IF_7$, $OF_2$, $O_2F_2$ and mixtures of any two or more thereof.

4. A process as claimed in claim 1, which includes selecting the oxygen-containing gas which reacts with the exposed surface from molecular oxygen, ozone and mixtures thereof.

5. A process as claimed in claim 1, which includes diluting the oxyfluorinating atmosphere with a diluent gas which is inert to the exposed surface and inert to the other constituents of the oxyfluorinating atmosphere, and does not react therewith.

6. A process as claimed in claim 1, which includes using, as the oxyfluorinating atmosphere, a gas/vapour mixture of molecular fluorine, molecular oxygen and water vapour.

7. A process as claimed in claim 6, which includes diluting the oxyfluorinating atmosphere, using molecular nitrogen as a diluent.

8. A process as claimed in claim 1, which includes exposing the solid material to a said oxyfluorinating atmosphere in which the fluorine-containing gas forms 5–20% by volume and the oxygen-containing gas forms 5–95% by volume.

9. A process as claimed in claim 1 in which the exposing of the solid surface to the oxyfluorinating atmosphere is for a period of 1 second–1 hour.

10. A process as claimed in claim 1, in which the solid surface which is exposed to the oxyfluorinating atmosphere is dry.

* * * * *

UNITED STATES PATENT AND TRADEMARK OFFICE
CERTIFICATE OF CORRECTION

PATENT NO. : 7,225,561 B2
APPLICATION NO. : 10/532461
DATED : June 5, 2007
INVENTOR(S) : Louw et al.

It is certified that error appears in the above-identified patent and that said Letters Patent is hereby corrected as shown below:

Claim 1, lines 21-24, "elastomeric materials having constituents which are not confined to carbon and hydrogen and which include, in addition to carbon and hydrogen, other atomic species as constituents" should read -- elastomeric materials having constituents which are confined to carbon and hydrogen, polymeric materials having constituents which are not confined to carbon and hydrogen and which include, in addition to carbon and hydrogen, other atomic species as constituents, elastomeric materials having constituents which are not confined to carbon and hydrogen and which include, in addition to carbon and hydrogen, other atomic species as constituents--;

Claim 1, line 27, "our" should read --out--.

Signed and Sealed this

Fourth Day of September, 2007

JON W. DUDAS
*Director of the United States Patent and Trademark Office*

UNITED STATES PATENT AND TRADEMARK OFFICE
CERTIFICATE OF CORRECTION

PATENT NO. : 7,225,561 B2  Page 1 of 13
APPLICATION NO. : 10/532461
DATED : June 5, 2007
INVENTOR(S) : Louw et al.

It is certified that error appears in the above-identified patent and that said Letters Patent is hereby corrected as shown below:

Delete columns 1 line 1 through columns 24 line 35 and Insert columns 1 line 1 through columns 24 line 36 as attached Signed and Sealed this Third Day of June, 2008

JON W. DUDAS
*Director of the United States Patent and Trademark Office*

OXYFLUORINATION

This application is a §371 U.S. national stage filing of international application PCT/IB2003/004701, filed 23 Oct. 2003 (published in English on 6 May 2004 as WO 2004/037905 A1) and claiming priority to ZA 2002/8671 filed 25 Oct. 2002 and ZA 2003/1355 filed 18 Feb. 2003.

THIS INVENTION relates, broadly, to oxyfluorination. More particularly the invention relates to a process for the oxyfluorination of a surface of a solid to activate it.

According to the invention, there is provided a process for the activation by oxyfluorination of at least part of a surface of a solid, which process includes exposing, under selected conditions of temperature and pressure and for a selected reaction time, at least part of the surface of the material of the solid to an oxyfluorinating atmosphere which is a gas/vapour mixture which includes at least one fluorine-containing gas which reacts with the material of the exposed surface, at least one oxygen-containing gas which reacts with the material of the exposed surface, and water vapour, said gases in the oxyfluorinating atmosphere acting to oxyfluorinate the exposed surface, thereby to activate it, and the water vapour acting to enhance the activation of the exposed surface to enhance the amenability of the exposed surface to adhesive bonding to other materials, the process including selecting the fluorine-containing gas from the group consisting of $F_2$, $XeF_2$, $ClF$, $ClF_3$, $BrF$, $BrF_3$, $BrF_5$, $IF_7$, $OF_2O_2F_2$ and mixtures of any two or more thereof.

By fluorine-containing gas is meant that each molecule of the gas contains at least one fine atom, and the term oxygen-containing gas has a corresponding meaning.

In particular, the enhancement of the activation of the exposed surface may act to enhance the amenability of the exposed surface to adhesive bonding to other materials. Such other materials include inks or pigments printed thereon, coating materials deposited thereon by metallization such as vapour phase metallization, and in particular glues and adhesives, ceramics and paints. Such other materials also include matrix materials such as concretes or other set cementitious materials or the like, reinforced by the solid having the activated surface in the reinforcement of such matrix materials by oxyfluorinated reinforcing materials, for example in the production of composite products.

Thus, for applications involving the formation of an adhesive bond between two components, by bringing the components into contact with each other with one of the components being in a flowable or mouldable state and with the other of the components being in solid form and having a surface at least partly activated by oxyfluorination, and causing or allowing the flowable or mouldable component to set or cure in contact with the solid component, thereby to bond adhesively to the solid component to form an adhesive bond therebetween, the process of the present invention acts to provide the solid component with a surface whose enhanced activation in turn enhances adhesion of the set or cured component to the solid component, the surface activation of the solid component being effected prior to bringing the components into contact with each other.

The process may include selecting the solid material which is subjected to activation by oxyfluorination from the group consisting of polymeric materials having constituents which are confined to carbon and hydrogen, elastomeric materials having constituents which are confined to carbon and hydrogen, polymeric materials having constituents which are not confined to carbon and hydrogen and which include, in addition to carbon and hydrogen, other atomic species as constituents, elastomeric materials having constituents which are not confined to carbon and hydrogen and which include, in addition to carbon and hydrogen, other atomic species as constituents, carbon, glasses, metals, metalloids, wood, leather, cotton, wool, ceramics, asbestos and blends and mixtures thereof. It is expected that the enhanced bonding of the present invention will have substantial utility in the coating of polymeric and elastomeric substrates, particularly those which are refractory or resistant to coating. When the process is used to produce activated polymeric or elastomeric products which are intended for coating, the process may include selecting the solid material which is subjected to activation by oxyfluorination from the group of materials consisting of polymeric materials, elastomeric materials and mixtures of any two or more thereof. The process may include selecting the solid material which is subjected to activation by oxyfluorination from the group of such materials having constituents which are confined to carbon and hydrogen, such as hydrocarbon polymers, or instead, the process may include selecting the solid material which is subjected to activation by oxyfluorination from the group of such materials having constituents which are not confined to carbon and hydrogen and which include, in addition to carbon and hydrogen, other atomic species as constituents. Such polymeric materials and mixtures or blends thereof all comprise hydrogen atoms which can be replaced by fluorine atoms. Such polymers can be used for the mass production of motor-vehicle parts, such as bumpers or buffers, in which case it can be important and desirable to be able to coat them with durable paint coatings, which adhere strongly thereto. Similar considerations can nevertheless also apply to coating solid materials which are not of polymeric materials, but which have surfaces which can be activated by the activating atmosphere to receive coatings, with desirable adhesion thereto.

It is further expected that the products of the process of the present invention will have substantial utility in the production of composite materials, structures and/or artifacts wherein a matrix such as a cementitious matrix is strengthened or reinforced by reinforcing material. In these cases the component in the flowable mouldable state is typically a cementitious slurry which is caused or allowed to set and/or cure in contact with the solid component which acts as a reinforcing component, to form a set cementitious matrix which adhesively adheres by means of a cementitious bond to the reinforcing component so that the matrix is strengthened and reinforced thereby. Such cementitious matrices have, typically, a relatively low tensile strength and/or a relatively low fracture toughness, whereas the reinforcing materials typically have a relatively high tensile strength and/or fracture toughness. The reinforcing material will thus be solid at ambient temperatures and may comprise particles such as granules, or, in particular, fibres, and may be in the form of a polymeric material, a metal, carbon or a glass which is activated by the oxyfluorination.

As indicated above, examples of polymeric materials contemplated for activation by oxyfluorination by the process of the present invention include polymers which are polyhydrocarbons such as polypropylene, polyethylene, polystyrene, polypentene, polybutadiene, or the like, consisting only of carbon and hydrogen, and mixtures or blends of two or more such polymers, which may be selected from hydrocarbon homopolymers and copolymers such as block copolymers, random- or statistical copolymers and graft copolymers, and from higher polymers such as terpolymers, containing only carbon and hydrogen. Instead, the polymeric materials selected for activation by oxyfluorination may comprise polymers of olefins which do not only contain carbon and hydrogen. Furthermore, depending on their end use, said hydrocarbon polymers may be blended or mixed with application-specific additives which do not contain only carbon and hydrogen, and/or the hydrocarbon polymers may be blended or mixed with polymers of olefins which do not contain only carbon and hydrogen, but which contain other constituents, each of such polymer groups again optionally being homopolymers or copolymers such as block copolymers, random- or statistical copolymers, graft copolymers, or higher polymers such as terpolymers, for example polyamides (nylons), aramids (kevlars) or acrylonitrile butadiene styrenes (ABS polymers), one or more of which olefins is a polymer having a constituent other than carbon or hydrogen, provided that the polymer containing the application-specific additive or having a constituent other than carbon or hydrogen comprises hydrogen atoms which are replaceable by fluorine atoms, before activation thereof in accordance with the process of the present invention. Blends which are activated by oxyfluorination may be formed by physically blending their constituents or by polymerizing their constituents together in a reactor. Whatever the nature of the polymer, it should, however, contain hydrogen surface atoms which are replaceable by fluorine atoms and preferably also by oxygen atoms during oxyfluorination of its surface.

When the enhanced bonding of the products of the process of the present invention is utilized for the strengthening and reinforcement of a cementitious matrix, the reinforcing component material is conveniently a polypropylene or a polyethylene, such as an ultra-high mass polyethylene (UHMPE), or a higher polymer such as a nylon, a kevlar or an ABS polymer, or indeed a material other than a polymer, but which has surfaces which can be activated by the activating atmosphere of the present process, examples being carbon and steels such as mild steel, galvanized steel and stainless steel. When the enhanced bonding of the products of the process of the present invention is utilized for the coating of solid components in the form of polymers, the polymer is conveniently an olefinic polymer such as a polypropylene homopolymer, a high-density polyethylene (HDPE) or a reactor-grade thermoplastic olefin (RTPO).

The process may include selecting the solid material which is subjected to activation by oxyfluorination from the group of materials consisting of carbon, glasses, metals, metalloids and mixtures of any two or more thereof. In particular, the process may include selecting carbon as the solid material which is subjected to activation by oxyfluorination.

Instead, the process may include selecting the solid material which is subjected to activation by oxyfluorination from metals and metalloids which are members of the group consisting of mild steel, low carbon steel, stainless steel, and mixtures or alloys of any two or more thereof. In particular, the process may thus include selecting mild steel or low carbon steel as the solid material which is subjected to activation by oxyfluorination.

As will be appreciated and as indicated above, exposing the surface of the solid material to the oxyfluorinating atmosphere comprising the gas/vapour mixture of the present invention will be under conditions of temperature and pressure, and for a reaction time, selected to provide the exposed surface with desired properties such as, in particular, an enhanced amenability to adhesive bonding to other materials. In particular, the process may include selecting the fluorine-containing gas which reacts with the exposed surface from the group consisting of molecular fluorine ($F_2$), fluorinated noble gases, fluorohalogens, oxides of fluorine, and mixtures of any two or more thereof. As indicated above, the fluorine-containing gas may be molecular fluorine ($F_2$) itself, or it may be made up of one or molecular suitable fluorine-containing gaseous compounds, examples of which are fluorinated noble gases such as $XeF_2$, or fluorohalogens such as $ClF$, $ClF_3$, $BrF$, $BrF_3$, $BrF_5$, and $IF_7$, or oxides of fluorine such as $OF_2$ or $O_2F_2$ so that, in other words, the oxyfluorinating atmosphere may include a fluorine-containing gaseous compound selected from the group consisting of $F_2$, $XeF_2$, $ClF$, $ClF_3$, $BrF$, $BrF_3$, $BrF_5$, $IF_7$, $OF_2$ or $O_2F_2$ and mixtures of at least two such gases.

Furthermore, the process may include selecting the oxygen-containing gas which reacts with the exposed surface from molecular oxygen ($O_2$) (such as the oxygen present in ambient air), ozone ($O_3$) and mixtures thereof. In other words, the oxygen-containing gas may be selected from the group of oxygen-containing gaseous compounds consisting of $O_2$, $O_3$ and mixtures thereof.

Optionally, the oxyfluorinating atmosphere may include, in addition to any fluorine-containing gaseous compound, any oxygen-containing gaseous compound and any further reactive gas, also at least one inert- or diluent gas which is inert to, and does not react with, the exposed solid material surface, such gas being, for example, helium, argon, carbon dioxide, or, in particular, molecular nitrogen ($N_2$). Thus, broadly, the process may include diluting the oxyfluorinating atmosphere with a diluent gas which is inert to the exposed surface and inert to the other constituents of the oxyfluorinating atmosphere, and does not react therewith. For example, the oxyfluorinating atmosphere may be a mixture of fluorine gas and wet or moist air containing water vapour, which can more correctly be regarded as humid air, the atmosphere having, as constituents, $F_2$, $O_2$, $N_2$, and water vapour. Thus, the process may include selecting the inert gas from the group consisting of nitrogen, the noble gases and mixtures of any two or more thereof. More particularly, the process may gases and mixtures of any two or more thereof. More particularly, the process may include selecting the inert gas from the group consisting of helium, argon, carbon dioxide, molecular nitrogen ($N_2$) and mixtures of any two or more thereof.

In particular, the process may include using, as the oxyfluorinating atmosphere, a gas/vapour mixture of molecular fluorine ($F_2$) molecular oxygen ($O_2$) and water vapour. In this case, the process may include diluting the oxyfluorinating atmosphere, using molecular nitrogen ($N_2$) as a diluent.

If desired, the gas/vapour mixture may have its activity enhanced by subjecting it to ultra-violet (UV) radiation. Thus, optionally, the process may include subjecting the oxyfluorinating atmosphere to ultra-violet radiation before the exposing of the solid material to the oxyfluorinating atmosphere is ended. The subjecting of the oxyfluorinating atmosphere to ultra-violet radiation may be prior to the exposing of the solid material to the oxyfluorinating atmosphere. Instead or in addition, the subjecting of the oxyfluorinating atmosphere to ultra-violet radiation may be during the exposing of the solid material to the oxyfluorinating atmosphere.

The reaction conditions may vary between relatively broad limits. Thus the process may include exposing the solid material to a said oxyfluorinating atmosphere in which the fluorine-containing gas includes molecular fluorine ($F_2$) at a partial pressure of 0.01–200 kPa. The exposing of the solid material to the oxyfluorinating atmosphere may be for a period of 0.10 seconds–10 hours, at a total pressure of the oxyfluorinating atmosphere of 0.1–500 kPa with the surface of the solid material and the activating atmosphere at a temperature at which the solid material has a surface which is stable. By stable in this regard is meant that the surface shows no tendency to soften or melt at the temperature in question, and no tendency to char, decompose or disassociate. Preferably, the exposing of the solid material to the oxyfluorinating atmosphere is at a total pressure of 1–200 kPa, and at a said temperature which is above 0° C., for a period of 0.1 seconds–1 hour. More particularly, the exposing of the solid material to the oxyfluorinating atmosphere may be at a pressure 5–150 kPa and at a said temperature which is 20–100° C., for a period of 1 second–10 minutes. In other words, exposing the solid surface to the oxyfluorinating atmosphere may be for a period of 0.10 seconds–10 hours, e.g. 1 second–1 hour, at a total pressure of the activating atmosphere of 0.1 kPa–500 Kpa, e.g. 1 kPa–200 kPa, and at a temperature of the surface of the solid and of the oxyfluorinating atmosphere of above 0° C. at which the reinforcing component is solid, e.g. 0° C. up to the melting point of the solid, if it melts rather than charring or decomposing.

Furthermore, in the oxyfluorinating atmosphere, the fluorine-containing gas may, as indicated above, have a partial pressure from as low as 0.01 kPa up to as high as 200 kPa, when the fluorine-containing gas is $F_2$. Preferably the partial pressure, when the fluorine-containing gas is $F_2$, is 0.1–10 kPa, more preferably 1–5 kPa. Thus, the activation may be effected by exposing the solid surface to the oxyfluorinating atmosphere at a pressure of 1–200 kPa, more preferably 5–150 kPa, and at a temperature above 0° C. and below the melting or charring/decomposition temperature of the material of the solid, i.e. typically 20–100° C. Reaction times which are short have been found to be feasible, for example 0.1–60 seconds, typically 1–10 seconds or even 1–5 seconds.

In particular, the process may include exposing the solid material to a said oxyfluorinating atmosphere which, in addition to its comprising a fluorine-containing gas, an oxygen-containing gas and water vapour, includes at least one further reactive constituent selected from the group consisting of halogens, interhalogen compounds and mixture of any two or more thereof. In other words, the oxygenating atmosphere may, in addition to its comprising a fluorine-containing gas, an oxygen-containing gas, water vapour and any inert or diluent gas used, contain also at least one further reactive constituent selected from halogens other than fluorine, such as chlorine ($Cl_2$), bromine ($Br_2$) or indeed iodine ($I_2$) vapour, or selected from interhalogen compounds or mixtures thereof. The proportion of the fluorine-containing gas in the oxyfluorinating atmosphere can vary within wide limits. Thus, the fluorine-containing gas may form 0.1–99.0% by volume of said mixture, typically 1–30% by volume thereof. Particularly preferred oxyfluorinating atmospheres include those in which the fluorine-containing gas such as $F_2$ forms 5–20% by volume and oxygen ($O_2$) forms 5–95% by volume. The water vapour content of the oxyfluorinating atmosphere may be such that it has a relative humidity of 0.1–99%, preferably 30–90%, e.g. 50–80%.

Furthermore, the process may include exposing the solid material to a said oxyfluorinating atmosphere having a fluorine-containing gas content of 0.1–99% by volume. In particular, the exposing of the solid material may be to a said oxyfluorinating atmosphere having a fluorine-containing gas content of 1–30% by volume. Preferably, the process may include exposing the solid material to a said oxyfluorinating atmosphere of which the fluorine-containing gas forms 5–20% by volume and the oxygen-containing gas forms 5–95% by volume. Furthermore, the process may include exposing the solid material to an activating atmosphere which has a relative humidity of 0.1–99%, preferably 30–99%, and more preferably 50–80%.

Furthermore the process may include exposing the solid material to the oxyfluorinating atmosphere until the surface concentration of fluorine of said exposed surface has been increased by at least 0.01 $\mu gF/cm^2$. While the process may be such as to provide the exposed solid surface with a relatively low surface fluorine concentration, e.g. in the range of 0.01 $\mu gF/cm^2$–50 $\mu gF/cm^2$, the process may be used to provide higher surface fluorine concentrations of above 50 $\mu gF/cm^2$, which are obtainable, if desired.

In a particular embodiment, the fluorine-containing gas may be $F_2$, being present in the oxyfluorinating atmosphere at a partial pressure of 0.01 kPa–200 kPa, the exposing of the surface of the solid to the oxyfluorinating atmosphere being such as to provide the surface with a surface fluorine concentration of 0.01–50 $\mu gF/cm^2$. Thus, the process may include exposing the solid material to the oxyfluorinating atmosphere until the surface concentration of fluorine of said exposed surface has been increased by 0.01–50 $\mu gF/cm^2$.

In a particular embodiment, the process may include, prior to the exposing of the solid material to the oxyfluorinating atmosphere, degreasing the exposed surface, for example by washing the solid with water and a detergent followed by rinsing it with water and then treating it with isopropanol or another suitable organic solvent such as those used in the motor trade for dislodging grease or oil.

The process may include exposing the solid material to the oxyfluorinating atmosphere in a reaction chamber in a reaction vessel, the process including flushing the reaction chamber by means of the oxyfluorinating atmosphere prior to the exposing of the solid material to the oxyfluorinating atmosphere. The exposing of the solid surface to the activating atmosphere in the reaction chamber or the reaction vessel, which has been flushed by means of such oxyfluorinating atmosphere, may be carried out on a continuous basis or on a batchwise basis. If carried out on a continuous basis, exposing the solid surface to the atmosphere may be effected in in-line fashion by continuously transporting the solid through a reaction chamber, which may be open-ended, containing the atmosphere, which atmosphere may be replenished or continuously flushed through the reaction chamber at a suitable rate to maintain the desired concentrations of the reagent gases in the atmosphere. The oxyfluorinating or activating atmosphere may, as indicated above and if desired, be subjected to UV radiation, during the exposure of the solid thereto.

Naturally, routine experimentation will be carried out with regard to the various parameters such as oxyfluorinating or activating atmosphere compositions and pressures, reaction times, temperatures, or solid materials whose surfaces are activated, and the fluorine- and oxygen surface concentrations achieved thereon, to achieve optimum, or at least acceptable, results, bearing practical and economic considerations in mind.

The invention extends also to an oxyfluorination product whenever produced by the process of the present invention.

With regard to the coating of solid materials having surfaces activated by the process of the present invention, applying the coating to the oxyfluorinated surface may be by painting e.g. spray-painting, the oxyfluorinated surface with one of the following paints:

a single-component base coat in an organic solvent; followed by a clear two-component (top) coat in an organic solvent; or a two-component pigmented top coat in an organic solvent or diluent.

A resin- and a hardener- (or catalyst) component of a two-component polyurethane or epoxy paint are typically contained in two separate containers. When the paint is required for spray painting the resin and the hardener are mixed in a specified ratio and then thinned to a spraying viscosity. This paint mixture has a limited lifetime, usually a few hours. Single-component paints do not require or employ a hardener, and only need to be thinned to spraying viscosity.

With regard to the product of the process of the present invention, this extends to a solid material such as polymeric material, whenever coated by a coating adhesively bonded thereto. The product of the process of the present invention also extends to a composite material, structure and/or artifact which comprises a set matrix, such as a cementitious matrix, strengthened or reinforced by reinforcing material to which the cementitious matrix is adhesively bonded, the matrix comprising a settable, e.g. cementitious, component which has set in contact with a reinforcing component to form a matrix in contact with a reinforcing material comprising said reinforcing component, which matrix adheres thereto, by means of an adhesive bond, the reinforcing component having an oxyfluorinated surface to which the cementitious matrix adheres, the surface of the reinforcing component having been activated and oxyfluorinated in accordance with the process of the present invention.

The invention will now be described, by way of illustrative example, with reference to the following Examples and with reference to the accompanying diagrammatic drawings, in which:

FIG. 1 shows a three-dimensional view of a test sample used for the fibre pull-out tests described hereunder with reference to Examples 1 and 2; and FIG. 2 shows a diagrammatic flow/block diagram illustrating details of the reactor employed for the coating aspect of the present invention.

REINFORCING OF MATRICES

Example 1—Invention

Monofilament polypropylene fibres were produced by direct extrusion to have a rectangular cross-section nominally of 0.5 mm×1.3 mm, the fibres having a length of 40 mm, a specific gravity of 0.91, a tensile strength of 120 MPa and an elongation at break of 14%. The fibres were loaded under a humid ambient air atmosphere into a vacuum reaction vessel and the vessel was evacuated down to an absolute pressure of 15 kPa. The vessel was then loaded with a dry 20% $F_2$/80% $N_2$ (by volume) gas mixture up to an absolute pressure of 45 kPa at a temperature of 38° C., to form an oxyfluorinating atmosphere in accordance with the process of the present invention. The fibres had their surfaces activated by oxyfluorination by allowing them to remain exposed to and in contact with the activating atmosphere in the vessel for 2.5 hours at 38° C., after which the vessel was flushed with ambient air. During this contact the surfaces of the polypropylene fibres were activated by oxyfluorination, in the presence of water vapour, by oxygen from the air at 15 kPa remaining in the vessel after the evacuation, and by fluorine from the $F_2$/$N_2$ gas mixture added to said air, the water vapour also being derived from the air at 15 kPa remaining in the vessel after the evacuation. The water vapour provided the oxyfluorinating atmosphere at 45 kPa with a relative humidity of approximately 18%.

Example 2—Control

Example 1 was repeated except that the air at 15 kPa present in the vessel before loading of the $F_2$/$N_2$ gas mixture was replaced by artificial dry air, i.e. a dry mixture of 21% $O_2$/79% $N_2$ (by volume). This was effected by evacuation of the vessel down to a hard vacuum at effectively zero pressure for purposes of practical utility, followed in turn by loading of the $O_2$/$N_2$ mixture into the vessel and loading of the $F_2$/$N_2$ mixture into the vessel, to produce an essentially dry oxyfluorinating atmosphere containing negligible amounts of water vapour.

A highly flowable and readily castable and smoothable mortar slurry mix was prepared by mixing together ordinary Portland cement with dried natural river sand and water, in a cement:water:sand mass ratio of 1:0.52:2. The river sand had a maximum particle size in the range of about 2–4.7 mm and an average particle size in the range of about 0.6–1.5 mm. Mixing was effected manually until the mixture was substantially homogeneous. Fibre pull-out tests were then conducted on dumb-bell-shaped specimens, one of which is indicated by reference numeral 10 in FIG. 1, prepared by casting said mortar slurry mix when fresh into dumb-bell-shaped polymethyl-methacrylate moulds. Each specimen had a thickness T of 20 mm and a maximum width W of 51 mm, and had a waist 12 which divided it into two lobed parts 14. A plastics sheet 16 at the waist 12 separated the parts 14 from each other to prevent bonding therebetween. One of the monofilament fibres, after surface activation, was embedded at 20 in the specimen 10 to extend along the polar axis 18 of the specimen 10, with half (20 mm) of its length embedded in each lobed part 14. The specimen 10 was then allowed to set to form a set cementitious matrix in which the reinforcing component formed by the fibre 20 was embedded, adhesive cementitious bonding taking place between the fibre 20 and the matrix. The cast specimens were cured respectively for 7 and 28 days in water at a temperature of 21–25° C. The strength of the adhesive interfacial shear bond between the fibre 20 and the cementitious matrix was in each case measured using a tensile testing machine equipped with a 500N transducer and a data-logging system, operating at a pull-out rate of 2 mm/minute. The interfacial shear bond strength was calculated by dividing the maximum shear bond force attained by the bonding area of the fibre, i.e.:

$$\text{Interfacial shear bond strength} = \frac{\text{maximum shear bond force}}{2 \times \text{fibre length} \times (\text{width} + \text{thickness})}$$

The units of the shear bond force and length were selected so that the interfacial shear bond strength was obtained in MPa. The fibre pullout test results are presented in the following table, Table 1, for fibres produced by both Example 1 and Example 2, and in each case after 7 and 28 days' curing time respectively, five specimens being tested in each case.

TABLE 1

| | Shear bond strength (MPa) (7 days' curing) | Shear bond strength (MPa) (28 days' curing) |
|---|---|---|
| Example 1 | 0.40 | 0.33 |
| | 0.49 | 0.45 |
| | 0.58 | 0.55 |

TABLE 1-continued

| | Shear bond strength (MPa) (7 days' curing) | | Shear bond strength (MPa) (28 days' curing) |
|---|---|---|---|
| | 0.50 | | 0.46 |
| | 0.44 | | 0.50 |
| Average | 0.48 | Average | 0.46 |
| Example 2 | 0.42 | | 0.33 |
| | 0.39 | | 0.39 |
| | 0.48 | | 0.38 |
| | 0.35 | | 0.40 |
| | 0.37 | | 0.44 |
| Average | 0.40 | Average | 0.39 |

From Table 1 it emerges that the average interfacial bond strengths of the fibres treated according to Example 1 (Invention) were 0.48 MPa and 0.46 MPa respectively after 7 and 28 days' curing. The corresponding values for Example 2 (Control) were respectively 0.40 MPa and 0.39 MPa, respectively showing an increase of 20% after 7 days' MPa and of 18% after 28 days' curing, compared with the control.

Example 3—Invention

Example 1 was repeated using polypropylene fibres which were formed from fibrillated polypropylene tape produced by extrusion followed by a fibrillation process. The fibres had a nominal rectangular cross-sectional profile or outline of 0.097 mm×7.5 mm, being 36 mm in length, with a specific gravity of 0.91, a tensile strength of 128 MPa and an elongation at break of 5.3%.

Example 4—Control

Example 2 was repeated using the fibrillated fibres of Example 3.

A proprietary cementitious mixture, Concor HT Wetcrete, obtained from Concor Technicrete (Proprietary) Limited, of 13 Church Street, Crown Industrial Area, Johannesburg, South Africa was prepared to form a shotcrete mixture and was admixed with fibrillated fibres whose surfaces had been activated in accordance with Examples 3 and 4 respectively.

The constituents of the mixture, including the aggregate and fibres, were admixed until substantially homogeneous in a mechanical mixer which was connected to a spray nozzle by means of a peristaltic conveyor system. The proportion of fibres admixed with the shotcrete amounted to 9 kg fibres/m³ shotcrete. As soon as the mixture became homogeneous (i.e. after it was mixed for a period of about 4 minutes) it was passed along the peristaltic conveyor system and sprayed through the spray nozzle into a mould to spray-cast a square panel or slab having sides of 600 mm and a thickness of 100 mm. After the spray casting, the panel or slab was left in the mould under ambient air for 3 days, after which the panel or plate was water-cured for 25 days before energy-absorption tests were conducted on the panel or plate.

The energy-absorption tests were carried out by supporting each panel or plate along its 600 mm edges while centre-point-loading was applied thereto over a central square area having sides of 100 mm, respectively parallel to the 600 mm sides of the panel or plate. The load was applied to the face of each panel or plate opposite to the direction from which the mixture arrived in the mould from the spray nozzle, i.e. the load was applied to the face of the panel or slab which, during the spray-casting, had rested on and abutted on the 600 mm×600 mm floor of the mould which faced upwardly, the spraying taking place downwardly from the spray nozzle into the mould and on to the floor.

The panel or slab containing the fibres whose surfaces had been surface-activated in accordance with Example 3 was found to display a total energy absorption of 1096 joules(J), whereas the control panel or slab whose fibres had been surface-activated in accordance with Example 4 was found to display a total energy absorption of 688 J, i.e. the use of the activation atmosphere of Example 3 led to an increase of 59% in energy absorption of the panel or slab, compared with Example 4. Furthermore, while the load-bearing capacity over a deformation range of 5–25 mm of the latter panel or slab was found to decrease from 67 kN, progressively to a value of 7 kN, i.e. by a factor of 9.6, the load-bearing capacity over the same deformation range of the former was found to decrease at a slower rate from 54 kN, progressively over the same deformation range to a value of 26 kN, i.e. by a factor of only 2.1. Thus, in addition, the panel or slab containing fibres activated in accordance with Example 3 (invention) had a 3.7 times higher residual load-bearing capacity than the control panel or slab whose fibres had been activated in accordance with Example 4.

Coating of Materials

With regard to Examples 5–10 set out hereunder, a reactor-grade thermoplastic olefin (RTPO) SP 179-22 manufactured by Basell Polyolefins Company N.V., Woluwe Garden, Woluwedal 24, B-1932 Zaventem, Belgium, was used, except where other polymers are specified. This RTPO consists of isotactic polypropylene polymerized together with a reactor-made ethylene-propylene rubber (EPR).

Various oxyfluorination atmospheres were used. Degreasing of the materials took place before oxyfluorination by first washing with water and a detergent before rinsing with water, followed in some cases by wiping with isopropanol. In this regard the Applicant has found that the nature of the detergent was not critical, and a number of household detergents were found to be suitable. The fluorination took place at room temperature, typically 25° C., for various periods of time. In each case the treated surface, after drying if necessary, was painted.

In the tests whose results are set out in Tables 2, 3 and 4 hereunder, the following paint was applied:

A single-component polyurethane base coat in an organic solvent, obtained from Herberts (France) S. A., B. P. 1025, 78205, Nantes, La Jolie, Cedex, France, was used as a pigmented base-coating paint with the trade designation HERBERTS BN RG/PERSAN 777, RN 313.565 (Ref. No. FA 9211036) followed by a two-component unpigmented clear coat paint with the trade designation VERNIS 2-K EC 510027 (Ref. No. 9213226/FA 9213227) and a hardener designated FA 9212586. In each case two layers of base coat, each layer being at least 2 μm thick and the thickness of the layers amounting in total to at most about 15 μm thickness, were applied to the sample, followed by two layers of clear (top) coat, each of about 15–40 μm thickness. Each of the base coat layers was allowed to dry by leaving it exposed to air at room temperature for a period of 3–12 minutes, before the following layer was applied; and each layer was applied by spray-painting. The final layer was allowed to dry for 10 minutes and then baked at 80° C. for 30 minutes. The final layer was exposed to the air at room temperature for a period of 3 days before the pull-off tests were performed.

In the tests whose results are set out in Tables 5 and 6 hereunder the following paint was applied:

A two-component polyurethane pigmented topcoat obtained from Dulux AECI Paints (Proprietary) Limited, ALRODE, 1451, Gauteng Province, South Africa. This white-pigmented topcoat paint with the trade designation DUCO DURATHANE K Enamel Cathkin White/Wit (Ref. No. D 928-0025) and a hardener designated Slow D 928-0809 were used. In each case four layers of the two-component topcoat were applied, amounting to approximately 50 μm in total thickness. After the application of each layer, a flash-off period of 3–12 minutes was allowed before the following layer was applied. The final layer was allowed to dry for 10 minutes. The final layer was exposed to the air at room temperature for a period of 3 days before the pull-off tests were performed.

Water contact angles were measured, using a Cahn DCA 322 instrument obtained from MET Systems, 3 Gaiety Street, Robindale, Randburg, Gauteng Province, South Africa. The advancing and receding angles were measured as described in the Cahn DCA operating manual, using a stage speed of 50 μm/s.

Adhesion of the paint to the sample was tested by adhesively securing metal-backed test pads to the painted sample, using a cyanoacrylate adhesive available from Loctite (South Africa) (Proprietary) Limited under the trade designation of LOCTITE 496 CYANOACRYLATE. Pull-off adhesion strength was tested in accordance with International ISO Standard 4622–1978(E), using a 20 mm diameter test cylinder adhesively secured to the painted surface using said Loctite 496. The test cylinders were pulled from the painted test samples by means of a tensile tester, the force in Newtons (N) required to break the test assembly was recorded together with the standard deviation. The breaking strength in megaPascals (MPa) is given by F/314, where F is the breaking force in Newtons, and the test cylinders were 20 mm in diameter. The fracture surfaces were examined and the results were expressed as the percentage area and in terms of the site of the fracture, expressed in terms of adhesive-, cohesive- or adhesive/cohesive failure. In Tables 4–9 the following scheme was used to describe the site of fracture:

A=Cohesive failure of the sample material
A/B=Adhesive failure between sample material and first coat
B=Cohesive failure of first coat
B/C=Adhesive failure between first and second coats
—/Y=Adhesive failure between final coat and adhesive.

In Examples 5–10 a single-component paint is referred to as a 1-K paint, and a two-component paint is referred to as a 2-K paint.

Example 5

Samples in the form of plates made of the RTPO SP 179-22 having dimensions of 10 cm×10 cm were exposed to an oxyfluorinating atmosphere at 25° C. in a reaction vessel after evacuating air from the vessel to a residual air pressure of 25 kPa. The oxyfluorinating atmosphere was formed in the vessel at a total pressure of 30 kPa. The charged vessel contained a gas/vapour mixture made up of humid ambient air with a partial pressure of 25 kPa, and of an $F_2/N_2$ gas mixture at a partial pressure of 5 kPa, the $F_2/N_2$ mixture comprising 20% by volume $F_2$ and 80% by volume $N_2$. This gas mixture will be referred to hereunder as '5 kPa 20% $F_2/N_2/25$ kPa air mixture'. Oxyfluorinating times were varied from a minimum of 5 seconds up to a maximum of 1 hour (3600 seconds), to obtain various different surface concentrations of fluorine on the treated surface. Two layers of Herberts BN RG Persan base coat were applied followed by two layers of clear coat. The four layers had an approximate thickness of 52 μm. The painting took place after exposing the oxyfluorinated samples for 24 hours at 25° C. to humid ambient air to hydrolyse the oxyfluorinated surfaces. The standard deviation measured during the evaluation of the paint adhesion strength was about 1.4 MPa. Results are set forth in the following table, Table 2.

TABLE 2

SP 179-22 material exposed at 25° C. to 5 kPa 20% $F_2/N_2/25$ kPa air mixture painted with Herberts Persan 1-K base coat/2-K clear coat, after exposing the surface to humid ambient air for 24 h.

| Oxyfluorinating time (seconds) | Breaking force (MPa) | Nature of failure (%) | Fluorine concentration (μgF/cm²) | Water contact angle advance/recede (°) |
|---|---|---|---|---|
| 0 | 0 | 100A/B | 0 | 108.7/77.0 |
| 5 | 5.39 | 60A, 40A/B | 2.9 | 92.1/51.7 |
| 10 | 4.84 | 80A, 20A/B | 2.9 | 91.2/43.8 |
| 15 | 5.06 | 90A, 10A/B | 3.0 | 75.5/34.2 |
| 60 | 6.59 | 100A | 3.2 | 63.4/25.8 |
| 300 | 6.74 | 100A | 3.8 | 56.5/19.9 |
| 900 | 6.25 | 80A, 20A/B | 4.3 | 43.9/15.4 |
| 1800 | 6.54 | 100A | 4.8 | 65.5/20.2 |
| 3600 | 6.64 | 80A, 20A/B | 6.4 | 67.7/20.5 |

From Table 2 it is clear that excellent surface activation and paint adhesion were obtained from a 5 second exposure time onwards and that no decrease in the adhesion strength was observed for longer times, even after 1 hour of oxyfluorination. Although very little change in the amount of surface-incorporated fluorine was observed, initial changes in the water contact angle were sensitive measures for adequate activation. A surprisingly small amount of fluorine was incorporated in the surface.

Example 6

Example 5 was repeated except that the painted samples were immersed in water at 40° C. for 10 days before the paint adhesion strength was evaluated. The standard deviation in the breaking force was about 2.0 MPa. Results are set forth in the following table, Table 3:

TABLE 3

SP 179-22 material exposed at 25° C. to 5 kPa 20% $F_2/N_2/25$ kPa air mixture painted with Herberts Persan 1-K base coat/2-K clear coat after 24 hours exposure to air, followed by 10 days of immersion in water at 40° C.

| Oxyfluorinating time (seconds) | Breaking strength (MPa) | Nature of failure (%) |
|---|---|---|
| 5 | 5.10 | 90A, 10A/B |
| 10 | 6.90 | 100A |
| 15 | 6.59 | 100A |
| 60 | 5.89 | 100A |
| 300 | 8.21 | 100A |
| 900 | 11.61 | 100—/Y |
| 1800 | 7.97 | 100—/Y |
| 3600 | 4.38 | 100A |

From comparing the paint adhesion strength before water immersion (Table 2) to that after immersion (Table 3), it was clear that no decrease arising from the immersion was observed. In fact, an increase was generally observed.

Example 7

Using the same material, oxyfluorination and painting conditions as for Example 5, but with an oxyfluorinating time of 10 seconds, the influence of different partial pressures of fluorine was investigated. The results are summarized in Table 4 hereunder.

From Table 4 one can deduce that a partial pressure of 1 kPa of $F_2$ (5 kPa 20% $F_2/N_2/25$ kPa air mixture) is adequate to induce excellent adhesion strength.

TABLE 4

Material SP 179-22 exposed at 25° C. to various mixtures of $F_2/N_2$ and air with the air at 25 kPa and the $F_2/N_2$ at various different pressures for 10 seconds and then painted with Herberts Persan 1-K base coat/2-K clear coat after exposure to air for 24 hours.

| Pressure of 20% $F_2/N_2$ added to 25 kPa Air Mixture (kPa) | Breaking Strength (MPa) | Nature of Failure (%) | Water Contact Angle (°) Advance/Recede |
|---|---|---|---|
| 1 | No adhesion | No adhesion | 100/72.9 |
| 2 | No adhesion | No adhesion | 100/58.0 |
| 5 | 7.09 | 10A, 90A/B | 64.8/30.5 |
| 10 | 6.54 | 100—/Y | 68.7/29.3 |
| 20 | 8.62 | 40A/B, 60—/Y | 60.5/20.2 |
| 30 | 11.38 | 100—/Y | 59.7/24.4 |
| 40 | 9.44 | 100—/Y | 62.2/23.2 |

Example 8

As for Example 5, all SP 179-22 plate samples were oxyfluorinated for 10 seconds using 5 kPa 20% $F_2/N_2/25$ kPa air mixture, at different temperatures. The paint adhesion of the samples was evaluated after 10 days of water immersion at 40° C. The results are summarised in Table 5. From Table 5 it is clear that good adhesion was obtained over a wide oxyfluorination temperature range, but that adhesion decreased substantially when oxyfluorinating near the melting temperature (169° C.) of the plastic substrate. Comparing the 70.3° contact angle at 150° C. with that of Table 2, it was to have been expected that excellent adhesion would be achieved. This indicates that contact angle changes are not sufficient to predict adequate adhesion after water immersion.

TABLE 5

Material SP 179-22 oxyfluorinated at a number of different temperatures by exposure to 5 kPa 20% $F_2/N_2/25$ kPa air mixture for 10 seconds and then painted with Dulux Cathkin White after exposure to air for 24 hours.

| Oxyfluorination temperature (° C.) | Breaking strength (MPa) | Nature of failure (%) | Fluorine Concentration (µgF/cm$^2$) | Water contact angle (°) advance/recede |
|---|---|---|---|---|
| 25 | 7.66 | 10A, 90A/B | 2.7 | 63.0/34.6 |
| 50 | 9.24 | 10A, 90—/Y | 2.9 | 60.8/34.1 |
| 100 | 7.60 | 50A, 50A/B | 3.2 | 53.5/32.2 |
| 150 | No adhesion | No adhesion | 2.9 | 70.3/37.1 |

Example 9

Using the same oxyfluorination conditions as for Example 5 but fixing oxyfluorinating time at 10 seconds and using a 5 kPa 20% $F_2/N_2/25$ kPa air mixture, an SP 179-22 sample was oxyfluorinated. Instead of waiting for 24 hours before painting, the sample was painted with Dulux Cathkin White after exposure to the atmosphere, on the one hand, 600 seconds after oxyfluorination, and, on the other hand, 7 months after fluorination. The paint adhesion was evaluated after the painted sample was submerged for 10 days at 40° C. in water—See Table 6, Samples Nos. 1 and 2 hereunder.

Comparing the adhesion strength with that of a sample painted after 24 hours after oxyfluorination (e.g. adhesion strength of 7.66 MPa at 25° C. in Table 5) it is clear that paint adhesion strength was not influenced by the hydrolysis time of the substrate before painting.

Painting the oxyfluorinated sample after 7 months of exposure to the atmosphere had no detrimental effect on adhesion strength, as is apparent from a comparison of the respective breaking strength values of 6.7 MPa and 6.8 MPa, respectively of Sample 1 for 600 seconds and Sample 2 for 7 months in Table 6 hereunder. This result shows that surface oxyfluorination can be regarded as permanent.

To determine whether or not the paint adhesion strength deteriorates with time, an SP 179-22 sample, Sample 3 in Table 6 hereunder, was oxyfluorinated in the same fashion as for Samples 1 and 2. Sample 3 was exposed to air for 24 hours after oxyfluorination, before being painted with Herberts Persan 1-K base coat followed by a 2-K polyurethane clear coat (see paint system (a) in Example 7 hereunder). After one year's exposure to the laboratory atmosphere the paint adhesion strength was determined and a value of 10.3 MPa was obtained (see Sample 3 in Table 6) indicating that no loss in paint adhesion strength took place after one year. Indeed, samples submerged for 3 months in water at 50° C., did not show any decrease in paint adhesion strength.

TABLE 6

Material SP 179-22 exposed at 25° C. to a 5 kPa 20% $F_2/N_2/25$ kPa air mixture for 10 seconds, and then painted with Dulux Cathkin White and evaluated after different exposure times.

| Sample No | Breaking strength (MPa) | Nature of failure (%) | Fluorine Concentration (µgF/cm$^2$) | Water contact angle (°) advance/recede |
|---|---|---|---|---|
| 1 | 6.7[1] | 10A, 90A/B | 2.5 | 63.1/34.6 |
| 2 | 6.8[2] | 20A, 50A/B, 30—/Y | Not measured | Not measured |
| 3 | 10.3[3] | 100—/Y | Not measured | Not measured |

[1] Painted 10 minutes after surface oxyfluorination
[2] Painted 7 months after surface oxyfluorination
[3] Breaking strength evaluated one year after painting

Example 10

For this example a number of different polyolefin materials, known to be difficult to paint, were oxyfluorinated and painted with a variety of different paints. The following substrates were oxyfluorinated:

(a) A reactor-grade polypropylene SP 179-22 manufactured by Montell and obtained from Bruneal Plastics (Proprietary) Limited, PO Box 289, Lonehill 2062, Gauteng Province;

(b) A block copolymer manufactured by Plastomark (Proprietary) Limited of Highchem Park, 16 th Road, Midrand, Gauteng Province, Republic of South Africa;

(c) A polypropylene homopolymer from Polifin Limited, PO Box 72, Modderfontein, 1645, Republic of South Africa;

(d) A random or statistical polypropylene copolymer called Stat from Plastomark (Proprietary) Limited;

(e) A high-density polyethylene (HDPE) manufactured by BASF South Africa (Proprietary) Limited, 852, 16th Street, Midrand (Designation Lupolen 526125).

(f) A linear low-density polyethylene manufactured by Polyfin Limited (Rotational moulding grade 3185).

Samples of these olefin materials were oxyfluorinated by exposing them at 25° C. to a partial pressure of 5 kPa 20% $F_2/N_2$/25 kPa air mixture for 10 seconds and then painting them after 24 hours exposure to air with the following paints by spray-painting the surface to apply one of the following paint systems:

(a) A 1-K polyurethane base coat with the trade designation Herberts BN RG Persan 777 RN (RN 313. 565) followed by a 2-K polyurethane clear (top) coat with the trade designation VERNIS 2-K EC 510027 (Ref. No. 9213226/FA 9213227) and a hardener (Ref. No. FA 9212586).

(b) A 2-K topcoat with the trade designation DUCO DURATHANE K ENAMEL Catkin White (Ref. No. D 928-0025) obtained from Dulux (Proprietary) Limited, PO Box 911641, 117 Phillips Street, Rosslyn, Pretoria, Gauteng Province.

(c) An Epoxy 2-K paint with the trade designation Dulux Hi Chem Epoxi-Emalje Brilliant Green (Ref. No. D 355-0221) and a hardener (Ref. No. 39490) obtained from Dulux (Proprietary) Limited.

(d) A 1-K water-borne base coat (WBC), followed by the 2-K clear coat mentioned in (a) above, from Herberts.

(e) A 2-K soft-touch coat, trade designation Karl Wörwag, Wöropur-Softfeellack Schwartz Nach Matt (Ref. No. 64090) mit Hartner (Ref. No. 57859) obtained from Karl Wörag Lack-und Farbenfabrik GmbH & Co, Strohgäu Strasse 28, 70435 Stuttgart, Germany.

(f) A 1-K primer trade designation Plascon 1-K A/Dry H/Build Pd for P/Propyl. EPDM obtained from Plascon (Herberts), PO Box 1594, Port Elizabeth 6000, Eastern Cape Province, Republic of South Africa.

From Table 7 hereunder it can be seen that oxyfluorinations ((a)–(f)) generally led to improved paint- and primer adhesion when compared to the adhesion of a primer on a surface that had not been oxyfluorinated. Polymers containing propylene (RTPO SP 179, block copolymer, homopolymer, and random copolymer) showed better adhesion than those containing only ethylene (HDPE, LLDPE). The adhesion of paints applied directly to an oxyfluorinated surface was in most cases equal or better than the adhesion of primers on an oxyfluorinated surface.

It should be noted that the water-based or water-borne base coat (d) could be applied directly to the oxyfluorinated surface without first applying a primer. Thus, the use of adhesion promoters is not necessary when substrates are oxyfluorinated before paint application. This can eliminate the cost of applying expensive, environmentally unfriendly primer coats. This fact, as well as the excellent adhesion obtained on an oxyfluorinated sample with a water-borne base coat, can significantly reduce painting costs and reduce health risks for workers applying paints.

The soft-touch paint ((e) in Table 7) showed excellent adhesion to polypropylene-containing polymers. Soft-touch paints are generally applied to highly isotactic polypropylene block copolymers used for the interior trims and dashboards of motorcars. From Table 7 it can be seen that the adhesion of the soft-touch paint was excellent on the block copolymer.

TABLE 7

Various olefin polymers exposed at 25° C. to 5 kPa 20% $F_2/N_2$/25 kPa air mixtures for 10 seconds and then painted after 24 h with various paints. (g) Shows the breaking strength of the primer when applied to the various olefins not oxyfluorinated.

| Paint Type | Manufacturer | RTPO SP 179-22 Breaking strength MPa | RTPO SP 179-22 Nature of failure (%) | Block copolymer Breaking strength MPa | Block copolymer Nature of Failure (%) | Homopolymer Breaking strength MPa | Homopolymer Nature of failure (%) |
|---|---|---|---|---|---|---|---|
| (a) 1-K base/2-K clear polyurethane | Herberts | 4.7 ± 1.4 | 90A, 10A/B | 9.5 ± 2.4 | 100-/Y | 6.9 ± 2.2 | 100A |
| (b) Polyurethane 2-K top coat | Dulux | 6.7 ± 2.0 | 10A, 90A/B | 13.4 ± 2.1 | 10A, 90-/Y | 10.4 ± 4.0 | 100A/B |
| (c) Epoxy 2-K | Dulux | 6.9 ± 0.8 | 100B/C | 7.3 ± 0.6 | 100B/C | 7.8 ± 1.3 | 100B/C |
| (d) WBC/2-K clear | Herberts | 6.8 ± 2.1 | 100A/B | 9.8 ± 1.1 | 50B, 50A/B | 5.2 ± 1.5 | 100B/C |
| (e) Soft touch | Wörwag | 5.0 ± 1.5 | 20A, 30A/B, 50-/Y | 7.4 ± 1.7 | 100-/Y | 7.8 ± 1.6 | 60A, 4-/Y |
| (f) 1-K Primer/polyurethane 2-K top coat | Plascon/Dulux | 5.3 ± 1.2 | 70A, 30A/B | 5.4 ± 0.5 | 100A/B | 4.9 ± 1.1 | 100A/B |
| (g) Same as (f), but substrates unfluorinated | Plascon/Dulux | 2.8 ± 0.5 | 100A/B | 1.1 ± 0.2 | 100A/B | 3.23 ± 1.0 | 100A/B |

| Paint Type | Random copolymer Breaking strength MPa | Random copolymer Nature of failure (%) | HDPE Breaking strength MPa | HDPE Nature of failure (%) | LLDPE Breaking strength MPa | LLDPE Nature of failure (%) |
|---|---|---|---|---|---|---|
| (a) 1-K base/2-K clear polyurethane | 5.5 ± 0.6 | 100A | 4.2 ± 1.0 | 100A/B | 2.1 ± 0.3 | 100A/B |

TABLE 7-continued

Various olefin polymers exposed at 25° C. to 5 kPa 20% F₂/N₂/25 kPa air mixtures for 10 seconds and then painted after 24 h with various paints. (g) Shows the breaking strength of the primer when applied to the various olefins not oxyfluorinated.

| | | | | | | |
|---|---|---|---|---|---|---|
| (b) Polyurethane 2-K top coat | 6.1 ± 2.4 | 20A 80A | 2.5 ± 1.4 | 100/B | 1.5 ± 0.6 | 100A/B |
| (c) Epoxy 2-K | 5.7 ± 0.2 | 100A | 3.3 ± 1.0 | 100A/B | 1.8 ± 0.6 | 100A/B |
| (d) WBC/2-K clear | 6.1 ± 2.4 | 20A, 80A/B | 4.4 ± 1.0 | 100A/B | 1.8 ± 0.4 | 100A/B |
| (e) Soft touch | 8.5 ± 2.8 | 20A/B 80-/Y | 3.3 ± 0.8 | 100A/B | 1.3 ± 0.3 | 100A/B |
| (f) 1-K Primer/polyurethane 2-K top coat | 5.06 ± 0.7 | 100A/B | 3.8 ± 1.2 | 100A/B | 1.7 ± 0.2 | 100A/B |
| (g) Same as (f), but substrates unfluorinated | 3.1 ± 1.0 | 100A/B | 1.2 ± 0.2 | 100A/B | 0.9 ± 0.2 | 100A/B |

From the results in the Examples 5–10 it appears that the process of the present invention is capable of producing products with regard to which substantial breaking forces are required to break the bond between the oxyfluorinated surface of the sample, and the first or lowermost paint layer applied thereto. Typically failure takes place either under the oxyfluorinated surface, in the material of the sample, or at the outer surface of the paint, at the interface between the paint and the adhesive. In none of the tests was more than 40% of the site of the failure made up of adhesive failure between the oxyfluorinated sample surface and the first or lowermost coat of paint. Furthermore in each of Examples 5–10, depending on the exposure times, results could be achieved where no such adhesive failure at the sample/paint interface took place.

In particular it is to be noted that the humid ambient air (usually between 30% and 70% relative humidity) of the 5 kPa 20% F₂/N₂/25 kPa air mixture employed in Examples 5–10 contained sufficient humidity for the 5 kPa 20% F₂/N₂/25 kPa air mixture to have a moisture content in terms of water vapour of 2–10 mg/L.

Further tests, as set forth hereunder in Examples 11–13, were carried out to compare dry oxyfluorination with oxyfluorination using the gas/vapour mixture oxyfluorinating atmosphere of the present invention, containing water vapour. In Examples 11–13, the polypropylene homopolymer used was that listed under (c) in Example 10 above, and a rotational moulded linear low-density polyethylene (LLDPE) obtained from Sasol Polymers, a division of Sasol Limited, Johannesburg, under the trade designation Reference LLDPE HR 486/06.

Sample preparation was done in accordance with that described above for Examples 5–10 except that, instead of wiping with isopropanol, the samples were left to dry overnight. The paint used was the DUCO DURATHANE K ENAMEL Cathkin White/Nil (Ref. No. D 928-0025) top coat paint/Slow D 928-0809 hardener combination from Dulux AECI Paints (Proprietary) Limited referred to above. When an epoxy adhesive is referred to in Examples 11–13 it is that available from Pratley Manufacturing & Engineering Company (Proprietary) Limited, Factoria, Krugersdorp, P.O. Box 3055, Kenmare 1745 Gauteng Province, South Africa, under the trade designated Pratley Quickset White Epoxy Glue, which was used in accordance with the manufacturer's instructions. Adhesion was evaluated using the metal-backed test pads to measure pull-off and adhesion strength using a 20 mm diameter test cylinder according to International ISO Standard 4622-1978(E) as described above. Samples in the form of 10 cm×10 cm plates of the polymers described in Examples 11–13 were exposed to various oxyfluorinating gas/vapour mixtures according to the invention at 25° C. in a reaction vessel. The atmospheric relative humidity of the ambient air used was 50–70% during the course of carrying out Examples 11–13.

The apparatus of FIG. 2 was used to create a gas/vapour mixture as an oxyfluorinating atmosphere having a desired relative humidity in a reaction vessel.

In particular a humid oxyfluorination atmosphere of about 75% relative humidity and a dry oxyfluorination atmosphere of substantially 0% relative humidity were created.

In FIG. 2, the apparatus employed is generally designated by reference numeral 22. The apparatus comprised a reactor in the form of a stainless steel reaction vessel 24 shown provided with a lid 26 sealed by means of an O-ring 28. The reaction vessel 24 was provided with a heater jacket 30, and was connected via an inlet/outlet opening 32 in a lid 26 therefor, to a fluid flow line 34. The flow line 34 was provided with a pair of shut-off valves, respectively designated 36 and 38, joined together by a flexible metal bellows 40.

Flow line 34 branched from a manifold 42, to which were connected a plurality of flow lines respectively designated 44, 46, 48 and 50.

Flow line 44 led to a vacuum pump 52, and was separated from the remainder of the manifold 42 by a shut-off valve 54. Flow lines 46, 48 and 50 entered the manifold 42 on the same side of the valve 54 as the flow line 34, i.e. remote from the flow line 44.

Flow line 46, provided with a regulating valve 56 was a supply line for a mixture of F₂/N₂; and flow line 48, provided with a regulating valve 58 was a dry synthetic air supply line. In turn, the flow line 50 was provided with a shut-off valve 60 and a regulating valve in the form of an adjustable needle valve 62 and led to a gas-wash bottle 64, containing water 66 and provided with an air inlet pipe 68. Finally, a pressure transducer 70 was shown connected to the manifold 42 by a pressure line 72.

In other words the reactor 24 was a stainless steel vessel sealed by the O-ring 28. The temperature in the reactor was controlled by the heater jacket 30. For convenience valves 36 and 38 were joined by the flexible metal bellows 40. The glass gas-wash bottle 64 containing water 66 was used to humidify the air loaded into the fluorination reactor 24. Two valves 60, 62 were used at the point where the humidified air from the gas-wash bottle 64 was admitted to the manifold 42. Valve 62 was an adjustable needle valve that was set to deliver humidified air to the evacuated reactor 24 at a rate which resulted in a level of humidity of at least 75% relative humidity. Valve 60 was a shut-off valve, which was used to admit/shut-off the humid air flow into the manifold 42 and the reactor 24.

Vacuum pump 52 was connected to manifold 42 via the normally closed valve 54 and was used to evacuate the manifold 42 and reactor 24 before each run. The pressure transducer 70 constantly measured the pressure in the manifold 42 and reactor 24 of the apparatus 22 to control the steps of evacuation of the reactor 24 and subsequent loading of gas components from flow lines 46, 48 and 50. Valve 58 admitted the $F_2/N_2$ mixture via line 46 to the manifold 42 and was used to admit and regulate the loading of the $F_2/N_2$ mixture before the oxyfluorination process. During humid oxyfluorination air/water vapour mixture from gas-wash bottle 64 was loaded via the manifold 42 into the reactor 24 by opening valve 60 and adjusting valve 62 to achieve a desired loading rate. Instead, for dry oxyfluorination, dry synthetic air from a synthetic air cylinder (not shown) attached to supply line 48 using a flexible metal hose (also not shown) was fed via its own flow regulation valve (not shown) and valve 58 into the manifold 42. The synthetic air was purchased from Air Products (Proprietary) Limited, Kempton Park with the following specification:

a) Oxygen—20–22% by volume
b) Nitrogen—the balance
c) Water—less than 2 ppm

Humid Oxyfluorination Procedure

In operation the temperature of the reactor 24 was regulated at about 1–2° C. above ambient temperature by means of the heater jacket 30. The actual recorded temperatures during the test runs fluctuated between 25° C. and 30° C. Initially valves 36, 38, 60, 54, 58 and 56 were closed and the test samples were loaded into the open reactor 24. The lid 26 of the reactor 24 was then closed and sealed by means of O-ring 28. Valves 54, 36 and 38 were then opened and the manifold 42 and reactor 24 of the apparatus 22 were evacuated to as low pressure as possible whereafter valve 54 was closed. Valve 60 was then opened and humid air was admitted into the manifold 42 and reactor 24 at a desired rate by means of needle valve 62 to allow air of about 75% or more relative humidity into the reactor 24 up to a specified pressure. Valve 60 was then closed. The $F_2/N_2$ mixture from line 46 was then admitted up to a specified pressure in the manifold 42 and reactor 24, by slowly opening valve 56. Thereafter, valves 56, 38 and 36 were closed for the duration of the humid activation.

The test samples were left in contact with the gas mixtures for specified periods of time. Valves 54, 38 and 36 were then opened and the gases in the reactor 24 pumped off. Valve 54 was then closed and air from the atmosphere was admitted to the manifold 42 and reactor 24 by opening valve 60. When the pressure in the manifold 42 and reactor 24 reached about 80 kPa, valve 60 was closed and valve 54 was opened to allow pump 52 to pump air out of the manifold 42 and reactor 24. This cycle of evacuation and flushing with air was repeated three times in order to remove any residual fluorine and hydrofluoric acid from the reactor 24. Finally, air was allowed into the reactor 24 through valve 60 up to atmospheric pressure whereafter the lid was opened and the test samples removed from the reactor.

Dry Oxyfluorination Procedure

The only difference between dry and humid oxyfluorination was the use of dry synthetic air from the synthetic air bottle attached to line 48, instead of humid air from the gas-wash bottle 64. Special precautions were, however, taken in removing any moisture in the apparatus 22 therefrom, downstream of valve 60 before, during and after the dry oxyfluorination process.

The temperature of the reactor was controlled as before. Valves 36, 38, 60, 54, 58 and 56 were closed as before. Thereafter the apparatus was evacuated, followed by flushing to a pressure of about 80 kPa with dry synthetic air from the air supply connected to line 48 by manipulating valves 54 and 58 in succession. This was repeated three times in order to remove any traces of water from the manifold 42 and reactor 24. Dry air was then bled into the manifold 42 and reactor 24 up to atmospheric pressure, before closing all valves and opening the reactor lid 26. Pre-dried test samples were then quickly loaded into reactor 24, whereafter the reactor lid 26 was replaced and sealed with O-ring 28. A sequence of three successive evacuations, each followed by flushing with synthetic dry air to about 80 kPa, of the manifold 42 and reactor 24 was performed as before, to remove all traces of moisture therefrom. Finally, dry synthetic air was admitted to the manifold 42 and reactor 24 up to a specified pressure via valve 58. Valve 56 was then slowly opened and $F_2/N_2$ mixture admitted to the manifold 42 and reactor 24 to a specified partial pressure. Valves 56, 38 and 36 were then closed for the duration of the dry activation.

The test samples were left in contact with the oxyfluorination atmospheres for specified periods of time. Valves 54, 38 and 36 were then opened and the gases in the reactor 24 and manifold 42 evacuated therefrom by pump 52. The manifold 42 and reactor 24 were then flushed with synthetic dry air and evacuated three times as before to remove all residual fluorine and hydrofluoric acid. Finally, synthetic dry air was allowed to flush the reactor 24 through valve 58 up to atmospheric pressure whereafter the lid 26 was opened and the test samples were removed from reactor 24.

Example 11

Polypropylene homopolymer samples were cleaned and were subjected to dry oxyfluorination in the absence of water vapour, and to humid oxyfluorination in the presence of water vapour. The samples subjected to dry oxyfluorination were left for 24 hours in a silica gel-filled desiccator prior to oxyfluorination, whereas those subjected to humid oxyfluorination were equilibrated in a closed vessel with a relative humidity of ≧95% prior to oxyfluorination. All samples were oxyfluorinated for 10 seconds. For the dry oxyfluorination, samples were exposed to an oxyfluorinating gas atmosphere consisting of a $F_2/N_2$ gas mixture at a pressure of 3 kPa, the $F_2/N_2$ mixture comprising 20% by volume $F_2$ and 80% by volume $N_2$, and dry air consisting of an $O_2/N_2$ mixture comprising 21% by volume $O_2$ and 79% $N_2$ by volume, at a pressure of 25 kPa. The total reaction pressure was thus 28 kPa, and the atmosphere comprised 3 parts by volume of the $F_2/N_2$ mixture, mixed with 25 parts by volume of the $O_2/N_2$ mixture. For the humid oxyfluorination the atmosphere was the same, except that the dry air was replaced by air comprising $O_2$ and $N_2$ in the same 21:79 volume ratio, but of 75% relative humidity. The results are set forth in Table 8.

TABLE 8

2-K polyurethane paint adhesion strengths on dry- and humid oxyfluorinated polypropylene samples. Samples were painted within 1 hour of oxyfluorination.

| Dry Oxyfluorination | | Humid Oxyfluorination | |
|---|---|---|---|
| Breaking Strength (MPa) | Nature of Failure | Breaking Strength (MPa) | Nature of Failure |
| 9.88 | 100% A/B | 13.62 | 90%—/Y, 10% A/B |
| 13.82 | 100%—/Y | 9.75 | 90%—/Y, 10% A/B |
| 4.49 | 100% A/B | 11.40 | 90%—/Y, 10% A/B |
| 10.79 | 100%—/Y | 12.18 | 90%—/Y, 10% A/B |
| 7.35 | 50% A/B, 50%—/Y | 13.79 | 100%—/Y |
| Mean 9.3 ± 3.5 | | Mean 12.1 ± 1.7 | |

It was noted that for the dry oxyfluorination the adhesive failure generally occurred between the polypropylene substrate and the paint coating, while for the humid oxyfluorination the failure was between the paint coating and the adhesive, indicating superior paint adhesion to the substrate when humid oxyfluorination was employed. This was emphasised by the significant increase in average breaking strength from 9.26 MPa to 12.14 MPa when dry oxyfluorination was replaced by humid oxyfluorination. This was coupled with a substantial decrease in standard deviation, suggesting that humid oxyfluorination is more homogeneous than dry oxyfluorination, leading to a more reliable activation of the substrate with the potential for better quality control. The nature of the failure for the humid oxyfluorination samples indicated that the A/B bond strength was in fact greater than the average value of 12.14 MPa. Further tests using ambient air showed that a drop from 75% or higher down to 65% relative humidity in the humid oxyfluorination gave a mean breaking strength of 12.43 MPa, which compared favourably with the 12.14 MPa in Table 8 for 75% relative humidity.

Example 12

Example 11 was repeated on rotational moulded linear low-density polyethylene, with an increase of reaction time from 10 seconds to 3 minutes. Results are set forth in Table 9.

TABLE 9

2-K polyurethane paint adhesion strengths on dry- and humid oxyfluorinated linear low-density polyethylene.

| Dry Oxyfluorination | | Humid Oxyfluorination | |
|---|---|---|---|
| Breaking Strength (MPa) | Nature of Failure | Breaking Strength (MPa) | Nature of Failure |
| 0.93 | 100% A/B | 3.05 | 100% A/B |
| 1.91 | 100% A/B | 7.07 | 100% A/B |
| 0.78 | 100% A/B | 5.80 | 100% A/B |
| 1.26 | 100% A/B | 3.81 | 100% A/B |
| 5.86 | 100% A/B | 3.92 | 100% A/B |
| Mean 2.2 ± 2.1 | | Mean 4.7 ± 1.7 | |

With linear low-density polyethylene changing from the dry oxyfluorination to the humid oxyfluorination effectively doubled the breaking strength with a substantial decrease in standard deviation. In each case failure occurred between the polyethylene substrate and the paint coating. As with Example 11, the increase in breaking strength achieved by humid oxyfluorination was substantial.

Example 13

Example 11 was repeated except that the paint coating of Example 11 was replaced by a coating of Pratley Quickset White Epoxy Glue. Results are set forth in Table 10.

TABLE 10

Pratley Quickset White Epoxy Glue adhesion strength on polypropylene homopolymer.

| Dry Oxyfluorination | | Humid Oxyfluorination | |
|---|---|---|---|
| Breaking Strength (MPa) | Nature of Failure | Breaking Strength (MPa) | Nature of Failure |
| 2.76 | 100% A/B | 13.44 | 100% A |
| 5.04 | 50% A/B, 50% A/B | 13.93 | 100% A |
| 13.33 | 100% A | 12.19 | 100% A |
| 5.16 | 50% A/B, 50% A | 13.89 | 100% A |
| 11.18 | 100% A | | |
| Mean 7.07 ± 4.4 | | Mean 13.3 ± 0.9 | |

In Table 10 test results for certain samples were ignored and excluded because of uneven sample surfaces which rendered these test results unreliable. In Table 10 A/B refers to adhesive failure between the polypropylene substrate and the epoxy coating, while A refers to cohesive failure of the substrate. The results shown in Table 10 also confirm that changing from dry oxyfluorination to humid oxyfluorination led to an improvement of breaking strength for adhesive coatings as well as more homogeneous surface activation.

Here the epoxy coating also serves as the adhesive for securing the breaking strength test cylinder to the coating, so that no further adhesive is applied as in the case of paint coatings.

It is believed that the process of the present invention has broad application to a wide variety of solid materials where surface activation, particularly with respect to achieving enhanced adhesion, plays a role. A broad spectrum of materials is known to benefit from dry fluorination or dry oxyfluorination in terms of surface activation or modification, which leads to varying degrees of improved adhesion to flowable or mouldable substances such as glues, dyes, paints, resins, epoxies and various cementitious matrices. It is therefore expected that at least the same spectrum of materials is susceptible to enhanced surface activation or modification by oxyfluorination in the presence of water vapour according to the present invention, so as further to improve their adhesion properties. Thus, it is believed that the present invention can in principle be extended to activation of materials such as natural organic substances including wood, leather, textiles such as cotton and wool, and also to activation of inorganic substances such as metals or metalloids, ceramics, glass, asbestos and carbon. Enhanced activation, particularly with respect to adhesion, is thus expected to follow such oxyfluorination. In particular it is believed that the oxyfluorination of metal reinforcements in cementitious matrices may have the effect of ameliorating corrosion of the metal and thus reducing corrosion and cracking in the matrices.

The invention claimed is:

1. A process for the activation by oxyfluorination of at least part of a surface of a solid, which process includes exposing, under selected conditions of temperature and pressure and for a selected reaction time, at least part of the surface of the material of the solid to an oxyfluorinating atmosphere which is a gas/vapour mixture which includes at least one fluorine-containing gas which reacts with the material of the exposed surface, at least one oxygen-containing gas which reacts with the material of the exposed surface, and water vapour, said gases in the oxyfluorinating atmosphere acting to oxyfluorinate the exposed surface, thereby to activate the exposed surface to enhance the amenability of the exposed surface to adhesive bonding to other materials, the process including the steps whereby, in combination, the solid material which is subjected to activation by oxyfluorination is selected from the group whose members consist of carbon, polymeric materials having constituents which are confined to carbon and hydrogen, elastomeric materials having constituents which are confined to carbon and hydrogen, polymeric materials having constituents which are not confined to carbon and hydrogen and which include, in addition to carbon and hydrogen, other atomic species as constituents, elastomeric materials having constituents which are not confined to carbon and hydrogen and which include, in addition to carbon and hydrogen, other atomic species as constituents, and mixtures of any two or more of said members;

the exposing of the solid surface to the oxyfluorinating atmosphere is carried out on a continuous basis by continuously transporting the solid through an open-ended reaction chamber; and the water vapour acts further to enhance the amenability of the exposed surface, provided by the oxyfluorination achieved by said gases, to adhesive bonding to said other materials.

2. A process as claimed in claim 1, which includes selecting carbon as the material which is subjected to activation by oxyfluorination.

3. A process as claimed in claim 1, which includes selecting the fluorine containing gas from the group consisting of $F_2$, $XeF_2$, $ClF$, $ClF_3$, $BrF$, $BrF_3$, $BrF_5$, $IF_7$, $OF_2$, $O_2F_2$ and mixtures of any two or more thereof.

4. A process as claimed in claim 1, which includes selecting the oxygen-containing gas which reacts with the exposed surface from molecular oxygen, ozone and mixtures thereof.

5. A process as claimed in claim 1, which includes diluting the oxyfluorinating atmosphere with a diluent gas which is inert to the exposed surface and inert to the other constituents of the oxyfluorinating atmosphere, and does not react therewith.

6. A process as claimed in claim 1, which includes using, as the oxyfluorinating atmosphere, a gas/vapour mixture of molecular fluorine, molecular oxygen and water vapour.

7. A process as claimed in claim 6, which includes diluting the oxyfluorinating atmosphere, using molecular nitrogen as a diluent.

8. A process as claimed in claim 1, which includes exposing the solid material to a said oxyfluorinating atmosphere in which the fluorine-containing gas forms 5–20% by volume and the oxygen-containing gas forms 5–95% by volume.

9. A process as claimed in claim 1 in which the exposing of the solid surface to the oxyfluorinating atmosphere is for a period of 1 second–1 hour.

10. A process as claimed in claim 1, in which the solid surface which is exposed to the oxyfluorinating atmosphere is dry.

* * * * *